US012606575B2

(12) United States Patent
Imura

(10) Patent No.: US 12,606,575 B2
(45) Date of Patent: Apr. 21, 2026

(54) METHOD FOR SYNTHESIZING ZIRCONIUM COMPLEX

(71) Applicant: JFE ENGINEERING CORPORATION, Tokyo (JP)

(72) Inventor: Ryota Imura, Tokyo (JP)

(73) Assignee: JFE ENGINEERING CORPORATION, Tokyo (JP)

( * ) Notice: Subject to any disclaimer, the term of this patent is extended or adjusted under 35 U.S.C. 154(b) by 890 days.

(21) Appl. No.: 17/784,368

(22) PCT Filed: Dec. 8, 2020

(86) PCT No.: PCT/JP2020/045605
§ 371 (c)(1),
(2) Date: Jun. 10, 2022

(87) PCT Pub. No.: WO2021/145099
PCT Pub. Date: Jul. 22, 2021

(65) Prior Publication Data

US 2023/0047529 A1 Feb. 16, 2023

(30) Foreign Application Priority Data

Jan. 16, 2020 (JP) ................................ 2020-005187

(51) Int. Cl.
*C07F 7/00* (2006.01)

(52) U.S. Cl.
CPC .................................. *C07F 7/003* (2013.01)

(58) Field of Classification Search
CPC ...................................................... C07F 7/003
See application file for complete search history.

(56) References Cited

U.S. PATENT DOCUMENTS

| | | | | |
|---|---|---|---|---|
| 10,195,295 | B2 | 2/2019 | Buffel et al. | |
| 10,501,332 | B2 | 12/2019 | Scapens | |
| 12,351,890 | B2 * | 7/2025 | Imura | C07F 7/003 |
| 2010/0274039 | A1 | 10/2010 | Choi et al. | |
| 2014/0147381 | A1 | 5/2014 | Espenan | |
| 2017/0007726 | A1 | 1/2017 | Buffel et al. | |
| 2018/0319671 | A1 | 11/2018 | Scapens | |
| 2019/0038785 | A1 | 2/2019 | Wadas et al. | |
| 2021/0017099 | A1 | 1/2021 | Dudkin et al. | |
| 2022/0259698 | A1 | 8/2022 | Imura | |

FOREIGN PATENT DOCUMENTS

| | | | |
|---|---|---|---|
| CN | 101909744 | A | 12/2010 |
| CN | 105939994 | A | 9/2016 |
| CN | 106075484 | A | 11/2016 |
| CN | 108473337 | A | 8/2018 |
| JP | 2018-123372 | A | 8/2018 |
| JP | 6665806 | B2 | 3/2020 |
| KR | 20220029691 | A | 3/2022 |
| WO | 2017/161356 | A1 | 9/2017 |
| WO | 2019/125982 | A1 | 6/2019 |

OTHER PUBLICATIONS

International Search Report issued in corresponding International Patent Application No. PCT/JP2020/045605, dated Feb. 2, 2021, with English translation.
D.N. Pandya et al., “Zirconium tetraazamacrocycle complexes display extraordinary stability and provide a new strategy for zirconium-89-based radiopharmaceutical development,” Chemical Science, 2017, 8, pp. 2309-2314.
S.A. Graves et al., “Evaluation of a chloride-based 89Zr isolation strategy using a tributyl phosphate (TBP)-functionalized extraction resin,” Nuclear Medicine an Biology, 2018, 64-65, pp. 1-7.
D.N. Pandya et al., “Polyazamacrocycle Ligands Facilitate 89Zr Radiochemistry and Yield 89Zr Complexes with Remarkable Stability,” American Chemical Society, Inorganic Chemistry, Nov. 10, 2020, vol. 59, No. 23, pp. 17473-17487.
Extended European Search Report issued for the corresponding European patent Application No. 20914026.8 on Dec. 20, 2023.
Final Office Action received in corresponding U.S. Appl. No. 17/630,472, dated Feb. 14, 2025.
Office Action received in corresponding Chinese patent Application No. 202080092776.4 on Jan. 31, 2024, with a concise statement of relevance and English Translation.
Australian Office Action issued in corresponding Australian Patent Application No. 2020423724, dated Apr. 19, 2023.
Office Action dated May 1, 2025, from corresponding Korean patent application No. 10-2022-7024350, 6 pages (includes English translation of the Search Report).
Office Action dated Sep. 10, 2024, from corresponding Korean patent application No. 10-2022-7024350 including Concise Statement of Relevance (English translation of the Search Report).
Anand, et al. “Zwitterions for impedance spectroscopy: The new buffers in town.” Analytica Chimica Acta 1166 (2021): 338547.
International Search Report dated Sep. 8, 2020, issued in corresponding International Application No. PCT/JP2020/025031.
Taha, M. et al. “Phase behavior and molecular dynamics simulation studies of new aqueous two-phase separation systems induced by HEPES buffer”, Journal of Physical Chemistry B, 2013, vol. 117, No. 2, pp. 563-582.
Extended European Search Report issued in corresponding EP Patent Application No. 20846290.3, dated Jun. 28, 2023.
Non-Final Office Action dated Sep. 9, 2024, from corresponding U.S. Appl. No. 17/630,472, 18 pages.
Canadian Office Action issued on Sep. 5, 2023 in the corresponding Canadian Patent Application No. 3,166,187.

* cited by examiner

*Primary Examiner* — John S Kenyon
(74) *Attorney, Agent, or Firm* — Rimon P.C.

(57) ABSTRACT

A method for synthesizing a zirconium complex includes setting a temperature of a mixed solution at a certain temperature or more to synthesize a zirconium complex, the mixed solution being obtained by mixing: an organic solvent containing an organic substance having water miscibility; a chelating agent solution in which a chelating agent is dissolved; and zirconium dissolved in an acidic solution.

11 Claims, 4 Drawing Sheets

METHOD FOR SYNTHESIZING ZIRCONIUM COMPLEX

CROSS-REFERENCE TO RELATED APPLICATIONS

This application is the U.S. National Phase under 35 U.S.C. § 371 of International Application No. PCT/JP2020/045605, filed on Dec. 8, 2020, which claims the benefit of Japanese Application No. 2020-005187, filed on Jan. 16, 2020, the entire contents of each are hereby incorporated by reference.

FIELD

The present invention relates to a method for synthesizing a zirconium complex, in which a complex of radioactive zirconium such as $^{89}Zr$ and a chelating agent is synthesized.

BACKGROUND

It has conventionally been known that radioactive zirconium ($^{89}Zr$) has high resolution and a medium half-life of about 78 hours and is thus a radio isotope effective in medical imaging. As a method for producing radioactive zirconium, a method irradiating an yttrium (Y) target with proton rays is known. In the method of production using proton rays, irradiation for a few hours generates a minute amount of radioactive zirconium in units of a few gigabecquerels (GBq) (a few tens of to a few hundreds of nanograms (ng) in terms of mass) in yttrium in units of a few hundreds of milligrams (mg).

For labeling of metal radioactive nuclides, 1,4,7,10-tetraazacyclododecane-1,4,7,10-tetraacetic acid (DOTA), 1,4,7-triazacyclononane-1,4,7-triacetic acid (NOTA), and similar compounds thereof are widely used as chelating agents. DOTA and NOTA are chelating agents having high versatility forming complexes with almost all metal nuclides such as radioactive copper (Cu), gallium (Ga), yttrium (Y), indium (In), lutetium (Lu), and actinium (Ac). Formation of a complex of DOTA and zirconium (Zr) has so far been considered to be difficult, but it has been revealed that the complex can be formed by reacting them at a high temperature of about 95° C. (refer to Non Patent Literature 1).

CITATION LIST

Patent Literature

Patent Literature 1: Japanese Patent Application Laid-open No. 2018-123372

Non Patent Literature 1: Zirconium tetraazamacrocycle complexes display extraordinary stability and provide a new strategy for zirconium-89-based radiopharmaceutical development, Chem. Sci. 2017, 8, 2309-2314.

Non Patent Literature 2: Evaluation of a chloride-based 89Zr isolation strategy using a tributyl phosphate (TBP)-functionalized extraction resin, Nucl. Bio. and Med., 2018, 64, 1-7.

SUMMARY

Technical Problem

However, to react radioactive zirconium ($^{89}Zr$) and DOTA while ensuring a sufficient radiochemical yield, the concentration of DOTA is required to be higher than $10^{-4}$ mol/L (refer to Non Patent Literature 2). The radiochemical yield means a yield of a target radioactive compound, is calculated by dividing the radioactivity of the target compound by the radioactivity of a raw material, and may be referred to simply as a yield. However, even when DOTA, the concentration of which is set to be higher than $10^{-4}$ mol/L, is reacted with radioactive zirconium according to the disclosure of Non Patent Literature 2, almost the entire radioactive zirconium precipitates or adheres to a reaction vessel and cannot be collected, making the radiochemical yield a low yield of less than 10% in some cases.

Furthermore, for a drug for use in positron emission tomography (PET) (hereinafter, a PET drug), microdosing, in which a dose is an extremely minute amount of the order of microgram (μg), is often performed. Thus, it is considered that even a drug containing DOTA with a low concentration of about $10^{-5}$ mol/L, which is less than $10^{-4}$ mol/L, in its structure has a substantial demand for labeling radioactive zirconium. In this case, DOTA and radioactive zirconium are desirably bonded to each other with a reaction rate higher than 90%. However, there is a problem in that even when DOTA with a concentration of about $10^{-4}$ mol/L, which is a higher than concentration than $10^{-5}$ mol/L, and radioactive zirconium are reacted based on reaction conditions by conventional technologies, the radiochemical yield is substantially 0%. The problems described above exist in NOTA as well.

The present invention has been made in view of the above, and an object thereof is to provide a method for synthesizing a zirconium complex, in which a zirconium complex can be synthesized by reacting a chelating agent such as DOTA or NOTA, even with a low concentration, and radioactive zirconium with a high reaction rate.

Solution to Problem

To solve the problem described above and to achieve the object, A method for synthesizing a zirconium complex according to one aspect of the present invention includes setting a temperature of a mixed solution at a certain temperature or more to synthesize a zirconium complex, the mixed solution being obtained by mixing: an organic solvent containing an organic substance having water miscibility; a chelating agent solution in which a chelating agent containing a structure represented by General Formula (1) or General Formula (2) is dissolved; and zirconium dissolved in an acidic solution, (1)

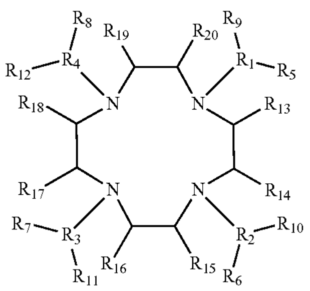

-continued (2)

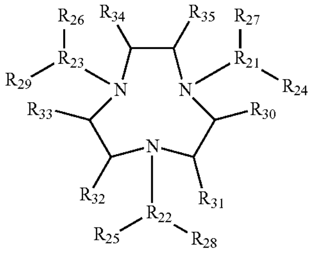

in General Formula (1), $R_1$, $R_2$, $R_3$, and $R_4$ are each hydrogen (—H) (in this case, none of $R_5$ to $R_{12}$ is further connected), a —CH— group, a —$(CH_2)_n$CH— group, a —N(═O) $(CH_2)_n$)NCH— group, or a —$(CH_2)_n$NC(═O)N— group; n is an integer of 0 or more; at least two of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$ are at least two selected from a carboxylic acid, a primary amide, hydroxamic acid, phosphonic acid, phosphoric acid, sulfonic acid, an alcohol, an amine, phenol, aniline, and an ester, a secondary amide, hydroxamic acid, and a phosphate that are each obtained by adding a substituent to the aforementioned, with the residual substituents being each hydrogen, an alkyl chain, a tert-butyl blocked carboxylic acid, nitrobenzene, or a substituent-added alkyl chain. A PET probe or a functional group facilitating bonding of a PET probe is optionally added to a functional group contained in $R_5$ to $R_{20}$; the functional group facilitating bonding is a carboxylic acid, a succinimide carboxylate, a tetrafluorophenol carboxylate, an alcohol, an amine, a thiol, an isothiocyanate, maleimide, phenol, aniline, benzoic acid, phenyl isothiocyanate, or an alkyne, an azide, dibenzocyclooctyne (DBCO), bicyclononyne (BCN), trans-cyclooctene (TCO), norbornene, tetrazine, or methyltetrazine, which are each a click chemistry reagent; and $R_5$ to $R_{20}$ optionally have a structure of the functional group facilitating bonding or a condensed structure of a PET probe and the functional group facilitating bonding, and in General Formula (2), $R_{21}$, $R_{22}$, and $R_{23}$ are each hydrogen (—H) (in this case, none of $R_{24}$ to $R_{29}$ is further connected), a —CH— group, a —$(CH_2)_n$CH— group, a —N(═O)$(CH_2)_n$NCH— group, or a —$(CH_2)_n$NC(═O)N— group; n is an integer of 0 or more; at least two of $R_{24}$, $R_{25}$, $R_{26}$, $R_{27}$, $R_{28}$, $R_{29}$, $R_{30}$, $R_{31}$, $R_{32}$, $R_{33}$, $R_{34}$, and $R_{35}$ are at least two selected from a carboxylic acid, a primary amide, hydroxamic acid, phosphonic acid, phosphoric acid, sulfonic acid, an alcohol, an amine, phenol, aniline, and an ester, a secondary amide, hydroxamic acid, and a phosphate that are each obtained by adding a substituent to the aforementioned, with the residual substituents being each hydrogen, an alkyl chain, a tert-butyl blocked carboxylic acid, nitrobenzene, or a substituent-added alkyl chain. a PET probe or a functional group facilitating bonding of a PET probe is optionally added to a functional group contained in $R_{24}$ to $R_{35}$; the functional group facilitating bonding is the following functional group: a carboxylic acid, a succinimide carboxylate, a tetrafluorophenol carboxylate, an alcohol, an amine, a thiol, an isothiocyanate, maleimide, phenol, aniline, benzoic acid, phenyl isothiocyanate, or an alkyne, an azide, DBCO, BCN, TCO, norbornene, tetrazine, or methyltetrazine, which are each a click chemistry reagent; and $R_{24}$ to $R_{35}$ optionally have a structure of the functional group facilitating bonding or a condensed structure of a PET probe and the functional group facilitating bonding.

In the method for synthesizing a zirconium complex according to one aspect of the present invention, the organic substance is methanol or ethanol.

In the method for synthesizing a zirconium complex according to one aspect of the present invention, a dipole moment of the organic substance is less than 3.0 D.

In the method for synthesizing a zirconium complex according to one aspect of the present invention, a concentration of the organic substance is 40% by volume or more.

In the method for synthesizing a zirconium complex according to one aspect of the present invention, an oxalic acid concentration is adjusted to be $10^{-6}$ mol/L or more and $10^{-4}$ mol/L or less.

In the method for synthesizing a zirconium complex according to one aspect of the present invention, the certain temperature is 35° C. or more.

In the method for synthesizing a zirconium complex according to one aspect of the present invention, the organic solvent is a solvent purified with a metal removing agent.

In the method for synthesizing a zirconium complex according to one aspect of the present invention, the acidic solution is hydrochloric acid.

In the method for synthesizing a zirconium complex according to one aspect of the present invention, zirconium dissolved in the acidic solution is mixed into a solution in which the organic solvent and the chelating agent solution are mixed together immediately before heating at the certain temperature or more or after the heating.

In the method for synthesizing a zirconium complex according to one aspect of the present invention, in at least one of $R_5$ to $R_{20}$ in General Formula (1) or at least one of $R_{24}$ to $R_{35}$ in General Formula (2), a molecular probe is bonded via at least one structure selected from the group consisting of Chemical Formulae (16) to (21) and (26) or a linker is bonded to a molecular probe via at least one structure selected from the group consisting of Chemical Formulae (16) to (21) and (26):

(16)

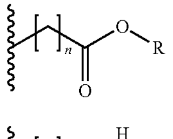

(17)

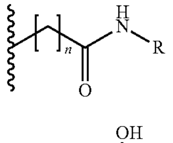

(18)

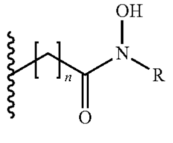

(19)

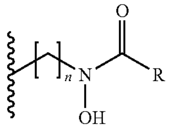

-continued (20)

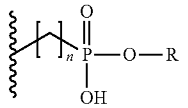

(21)

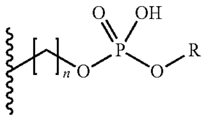

(26)

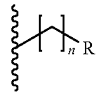

In the method for synthesizing a zirconium complex according to one aspect of the present invention, the molecular probe is a protein, a peptide, or a low-molecular weight organic compound.

In the method for synthesizing a zirconium complex according to one aspect of the present invention, the protein or the peptide includes a natural amino acid, a non-natural amino acid, or both the natural amino acid and the non-natural amino acid and has a linear-chain structure or a cyclic structure.

In the method for synthesizing a zirconium complex according to one aspect of the present invention, the linker is polyethylene glycol, an alkyl chain, piperazine, or a complex thereof.

Advantageous Effects of Invention

The method for synthesizing a zirconium complex according to the present invention can synthesize a zirconium complex by reacting a chelating agent such as DOTA or NOTA, even with a low concentration, and radioactive zirconium with a high radiochemical yield.

DESCRIPTION OF EMBODIMENTS

Figure 1:
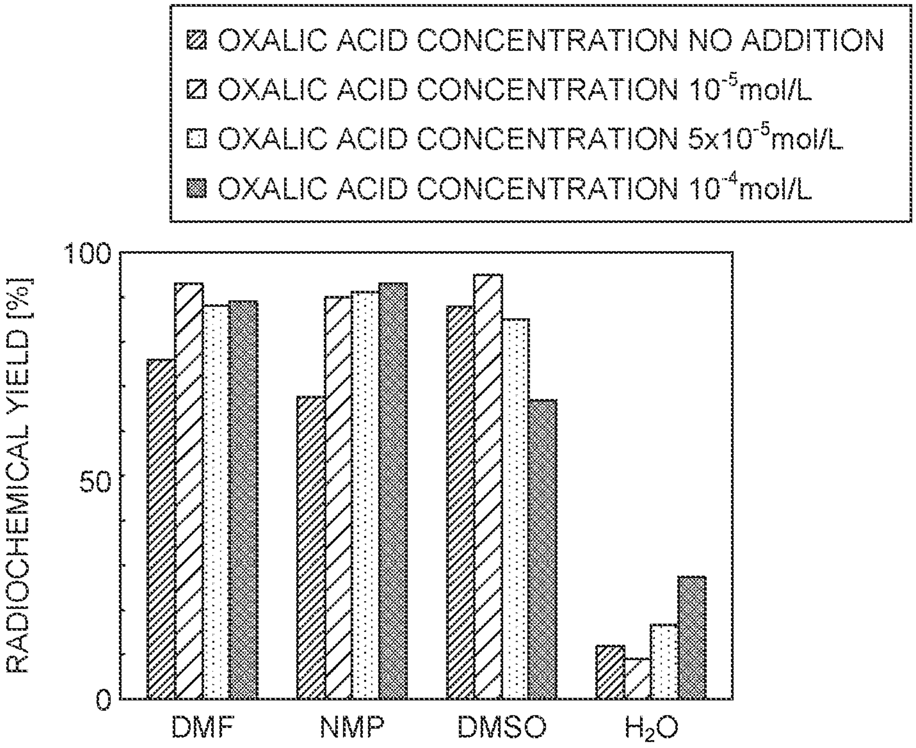
FIG. 1 is a graph illustrating an influence of oxalic acid on the radiochemical yield of DOTA-$^{89}$Zr in accordance with an oxalic acid concentration.

The following describes one embodiment of the present invention with reference to the accompanying drawings. The one embodiment described below does not limit the present invention. First, in describing the one embodiment of the present invention, to facilitate understanding of the present invention, the following describes experiments and earnest studies performed to solve the problems by the inventor of the present invention.

The following first describes a problem with conventional technologies about a reaction of radioactive zirconium (hereinafter, also referred to as zirconium, Zr, or $^{89}$Zr) as an object of the earnest studies by the inventor of the present invention and DOTA as a compound represented by General Formula (1) below.

DOTA indicated by General Formula (1) below can easily bond to radio isotopes (RIs) of many kinds of metals and has thus conventionally widely been used as a general-purpose chelating agent. Furthermore, in many drugs, methods for synthesizing DOTA derivatives have been established, and DOTA and derivatives thereof (1,4,7,10-tetrakis(carbamoylmethyl)-1,4,7,10-tetraazacyclododecane (DOTAM) and 1,4,7,10-tetraazacyclododecane-1,4,7,10-tetra(methylene phosphonic acid) (DOTP), for example) are easily available.

(1)

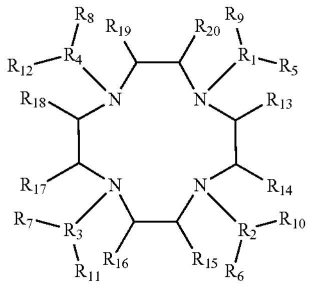

In General Formula (1), $R_1$, $R_2$, $R_3$, and $R_4$ are each hydrogen (—H) (in this case, none of $R_5$ to $R_{12}$ is further connected), a —CH— group, a —$(CH_2)_n$CH— group, a —N(=O)$(CH_2)_n$NCH— group, or a —$(CH_2)_n$NC(=O)N— group. n is an integer of 0 or more. At least two of $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$ are at least two selected from a carboxylic acid, a primary amide, hydroxamic acid, phosphonic acid, phosphoric acid, sulfonic acid, an alcohol, an amine, phenol, aniline, and an ester, a secondary amide, hydroxamic acid, and a phosphate that are each obtained by adding a substituent to the aforementioned, with the residual substituents being each hydrogen, an alkyl chain, a tert-butyl blocked carboxylic acid, nitrobenzene, or a substituent-added alkyl chain. A PET probe or a functional group facilitating bonding of a PET probe is optionally added to a functional group contained in $R_5$ to $R_{20}$. The functional group facilitating bonding is a carboxylic acid, a succinimide carboxylate, a tetrafluorophenol carboxylate, an alcohol, an amine, a thiol, an isothiocyanate, maleimide, phenol, aniline, benzoic acid, phenyl isothiocyanate, or an alkyne, an azide, dibenzocyclooctyne (DBCO), bicyclononyne (BCN), trans-cyclooctene (TCO), norbornene, tetrazine, or methyltetrazine, which are each a click chemistry reagent. $R_5$ to $R_{20}$ optionally have a structure of the functional group facilitating bonding or a condensed structure of a PET probe and the functional group facilitating bonding.

The functional group described above may have still another compound bonded via an ester bond, an amide bond, or the like or have branching for holding another compound from an alkyl chain. Specific examples include crosslink-forming functional groups such as succinimide, isothiocyanate, an amine, a thiol, and a carboxylic acid and click chemistry-oriented functional groups such as an azide, an alkene, an alkyne, and tetrazine. Furthermore, a drug for use in molecular imaging may be bonded via these crosslink-forming functional groups.

For each of $R_1$ to $R_4$, the structure represented by General Formula (3) below may be employed; specifically, one selected from the structures represented by Chemical Formulae (3-1) to (3-4) can be employed. Note that n in Chemical Formulae (3-2) to (3-4) is an integer of 0 or more.

(3)

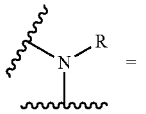

(3-1)

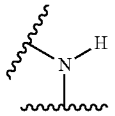

(3-2)

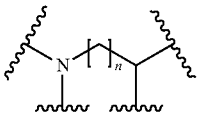

(3-3)

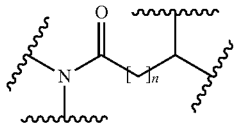

(3-4)

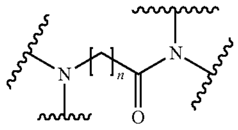

For each of $R_5$ to $R_{20}$, one selected from the structures represented by General Formulae (4) to (21) below can be employed. Note that n in General Formulae (4) to (21) is an integer of 0 or more. General Formulae (4) to (21) are functional groups that are likely to coordinately bond to metal. At least two of $R_5$ to $R_{12}$ are preferably selected from the structures represented by General Formulae (4) to (21). For each of $R_5$ to $R_{20}$, one selected from the structures represented by General Formulae (22) to (26) below can be employed. The structures represented by General Formulae (22) to (26) are structures that do not form any complex with a metal ion or are hard to form a complex therewith. In any of $R_1$ to $R_{16}$ in General Formula (1), a molecular probe may be bonded via at least one structure selected from the group consisting of Chemical Formulae (16) to (26), or a linker may be bonded to a molecular probe via at least one structure selected from the group consisting of Chemical Formulae (16) to (26).

(4)

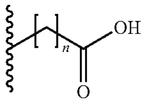

(5)

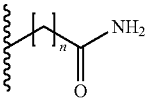

(6)

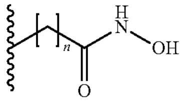

(7)

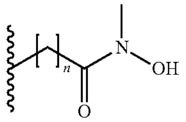

(8)

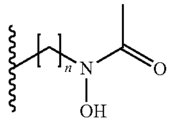

(9)

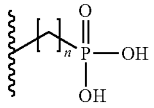

(10)

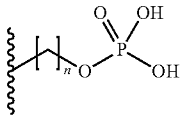

(11)

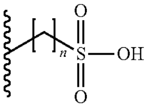

(12)

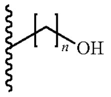

(13)

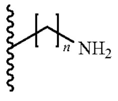

(14)

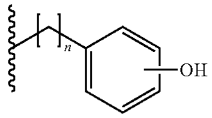

(15)

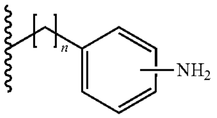

(16)

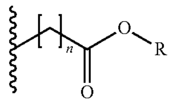

-continued (17)

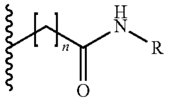

(18)

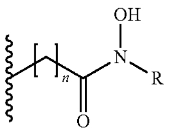

(19)

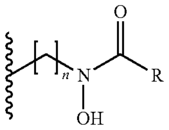

(20)

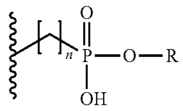

(21)

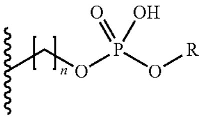

(22)

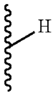

(23)

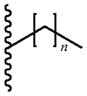

(24)

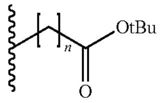

(25)

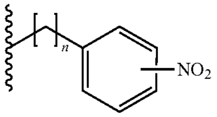

(26)

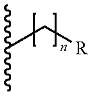

A complex of DOTA or a derivative of DOTA and a drug such as an antibody, a protein, a peptide, or a low-molecular weight organic compound as an object of a molecular imaging experiment can also be used. For the protein or the peptide, one including a natural amino acid, a non-natural amino acid, or both the natural amino acid and the non-natural amino acid and having a linear-chain structure or a cyclic structure can be employed. Specifically, a method amidating one carboxylic acid in the structure of DOTA and crosslinking it with the drug and a substance obtained through crosslinking from a cyclic alkyl chain in the structure of DOTA are known. Bonding may be performed via an appropriate linker such as polyethylene glycol between DOTA and the drug. Specifically, it has been used for high-molecular drugs such as antibodies and low-molecular drugs such as PSMA-617. The linker is typically, but is not necessarily limited to, polyethylene glycol, an alkyl chain, piperazine, or a complex of polyethylene glycol, an alkyl chain, or piperazine. In the present invention, the substance as an object of bonding is not limited to DOTA and also includes derivatives thereof and complexes with drugs. That is, for R in each of General Formulae (16) to (21) and (26) described above, one selected from the structures represented by Chemical Formulae (27) to (47) below can be employed. $^{89}Zr$ may be complexed in the DOTA structure after bonding the drug to R or the drug may be bonded to R after complexing $^{89}Zr$.

(27)

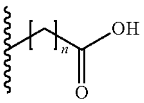

(28)

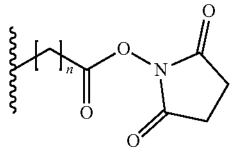

(29)

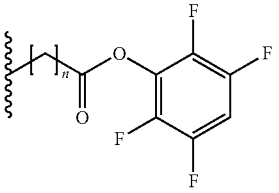

(30)

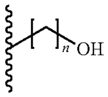

(31)

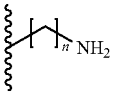

(32)

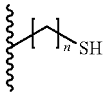

(33)

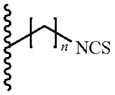

(34)

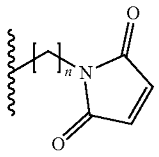

(35)

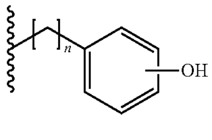

-continued (36)

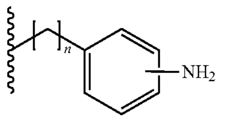

(37)

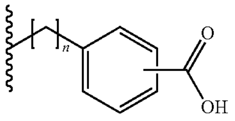

(38)

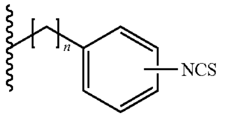

(39)

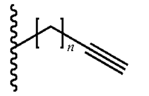

(40)

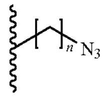

(41)

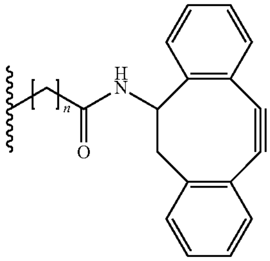

(42)

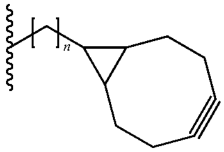

(43)

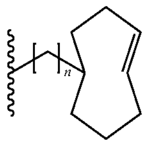

(44)

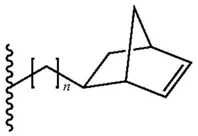

(45)

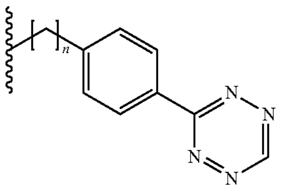

-continued (46)

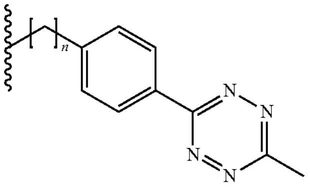

(47)

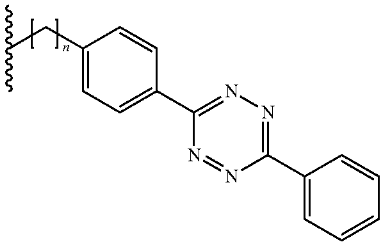

As described above, $^{89}Zr$ has an appropriate half-life and high resolution and is thus a nuclide extremely suitable for use in medical imaging. As the chelating agent for use in labeling of $^{89}Zr$, deferoxamine (DFO) indicated by Chemical Formula (100) below has conventionally been used, for example. DFO, having a weak bonding force with those other than Zr, is substantially an exclusive chelating agent for radioactive zirconium, and thus has a problem in that it has poor versatility and cannot be used also for imaging of other nuclides. Thus, a complex of DFO and the PET probe is required to be synthesized only for $^{89}Zr$ imaging, causing a problem of an increased cost of synthesis. In addition, DFO has an insufficient bonding force in bonding to Zr, causing a problem in that radioactive zirconium separates from a drug in living bodies in molecular imaging.

(100)

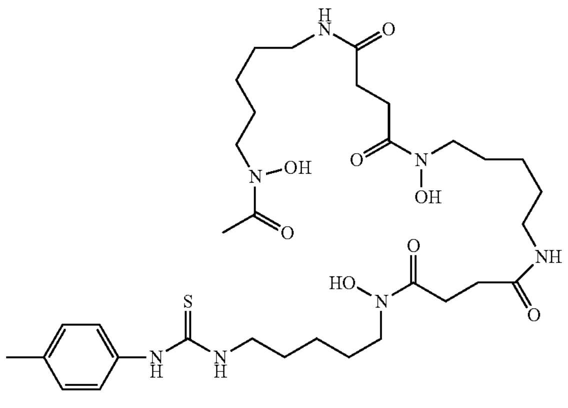

Given these circumstances, various methods using DOTA as the chelating agent described above and $^{89}Zr$ are being studied. When $^{89}Zr$ and DOTA are bonded together, the bonding itself is strong, thus giving an advantage that when medical imaging such as PET is performed, $^{89}Zr$ is hard to separate from the chelating agent in human bodies, and thus image quality can be improved. Furthermore, existing drugs containing DOTA developed for other nuclides such as $^{68}Ga$ can be diverted to chelating agents for $^{89}Zr$, thus achieving a low cost in development of drugs labeling $^{89}Zr$.

However, there is a problem in that bonding between DOTA described above and $^{89}Zr$ is extremely difficult.

Specifically, as described in Non Patent Literature 2, to bond $^{89}Zr$ and DOTA together in line with the conventional method bonding $^{89}Zr$ and the chelating agent together, it was necessary that the reaction temperature be 90° C. or more or preferably 95° C. or more, the reaction time be 1 hour, and the concentration of DOTA be $10^{-4}$ mol/L or more. The inventor of the present invention examined a radiochemical yield when $^{89}Zr$ and DOTA were reacted in accordance with the conditions described above, and it was revealed that even when an experiment was performed in accordance with the method described in Non Patent Literature 2, the reproducibility of results was low and the radiochemical yield was low in some cases. When $^{89}Zr$ is used for medical imaging, it is desirable that even DOTA with a concentration of about $10^{-5}$ mol/L be able to bond to $^{89}Zr$. However, when the inventor of the present invention examined the radiochemical yield on this condition, there was a problem in that the radiochemical yield was substantially 0%. The inventor of the present invention performed an experiment, and it was confirmed that the radiochemical yield being substantially 0% was caused by adhesion of the bulk of $^{89}Zr$ to a reaction vessel such as a microtube. The inventor of the present invention studied this point and assumed that $^{89}Zr$ precipitated as zirconium hydroxide to adhere to the reaction vessel.

The inventor of the present invention variously studied the problem and the cause about the foregoing reaction of $^{89}Zr$ and DOTA and thought that to obtain a high radiochemical yield in a complex forming reaction of $^{89}Zr$ and DOTA, it was necessary that a reaction rate be increased or that formation of a hydroxide of $^{89}Zr$ be inhibited. Given these circumstances, the inventor of the present invention performed various experiments and made earnest studies on the increase in the reaction rate and inhibition of the formation of the hydroxide. That is, the inventor of the present invention performed experiments in which metal ions such as iron ions ($Fe^{3+}$), titanium ions ($Ti^{4+}$), and yttrium ions ($Y^{3+}$) as impurities other than $^{89}Zr$ were mixed so as to have a molar concentration equal to DOTA with a concentration of $10^{-2}$ mol/L to be reacted. Consequently, as listed in Table 1, it was revealed that the bonding rate, that is, the radiochemical yield of $^{89}Zr$ reduced to about 10% to 32%. That is, it is revealed that DOTA reacts with the other metal ions in preference to Zr and that the other metal ions and Zr are not exchanged after the reaction. Thus, the metal ions as impurities are preferably removed in the present reaction. Specifically, metals as impurities are preferably removed by a metal removing agent such as a styrene-vinylbenzene copolymer containing iminodiacetate ions in a buffer solution and/or an organic solvent for use in the reaction of $^{89}Zr$ and DOTA. The purity of a purified solution of $^{89}Zr$ may be improved by employing the method described in Patent Literature 1.

TABLE 1

| Added metal ion | Bonding rate of $^{89}Zr$ |
|---|---|
| No addition | 92% |
| $Y^{3+}$ | 10% |

TABLE 1-continued

| Added metal ion | Bonding rate of $^{89}Zr$ |
|---|---|
| $Ti^{4+}$ | 12% |
| $Fe^{3+}$ | 32% |

The inventor of the present invention added dimethylsulfoxide (DMSO) indicated by Chemical Formula (200) below to react $^{89}Zr$ and DOTA, and it was confirmed that the reaction time was about 30 minutes, which was a half of conventional 1 hour, and that the radiochemical yield improved up to 95%. Furthermore, a phenomenon in which $^{89}Zr$ becomes zirconium hydroxide to adhere to the reaction vessel was almost unobserved.

(200)

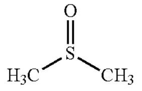

According to studies by the inventor of the present invention, in a mixed solution of DOTA and $^{89}Zr$, first, a reaction intermediate complex indicated on the left side of Reaction Formulae (301a) and (301b) below is generated. Subsequently, it is considered that this reaction intermediate complex is heated to change to DOTA-$^{89}Zr$ indicated on the right side of Chemical Formula (301a). Zr ions also strongly bond to water molecules and hydroxide ions, and thus it is also assumed that $^{89}Zr$ is divided from the reaction intermediate complex together with hydrating water by the heating to change to zirconium hydroxide indicated on the right side of Chemical Formula (301b). It is considered that the low yield based on the conventional reaction conditions is caused by the fact that zirconium hydroxide reacted as in Chemical Formula (301b) adheres to the reaction vessel or the like to become inactive in reactivity.

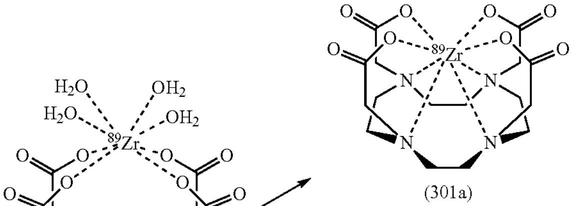

(301a)

(301b)

On the other hand, it is considered that when a highly polar substance such as DMSO is added, the coordination to $^{89}Zr$ in the reaction intermediate complex is competitive between the organic solvent and water. When the concentration of a highly polar organic solvent is sufficiently high, it is expected to take a coordination structure indicated in Reaction Formula (302) below. In this case, it is considered that, unlike the case in which water coordinates thereto, the thus generated reaction intermediate complex cannot cause a reaction to produce zirconium hydroxide, and thus the bulk of $^{89}Zr$ is generated as DOTA-$^{89}Zr$.

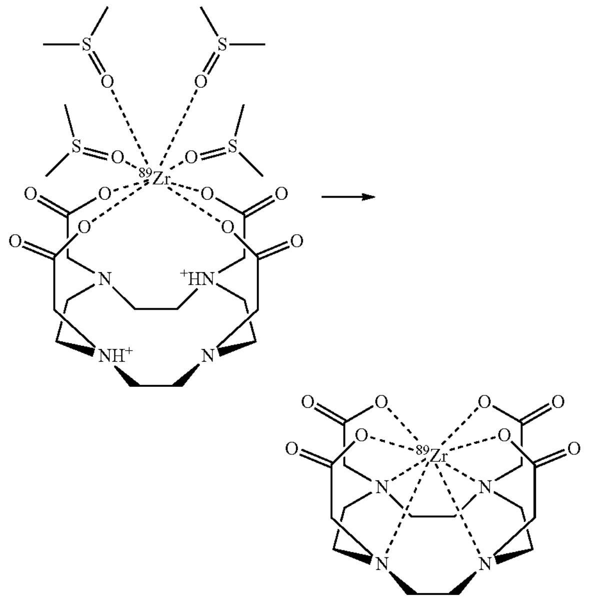

(302)

The inventor of the present invention made further studies based on the earnest studies described above. First, the inventor of the present invention studied a method to remove the organic solvent more efficiently. That is, the what is called highly polar organic solvent such as DMSO described above has a boiling point of as high as about 189° C., and thus it is extremely difficult to remove the solvent by evaporation. The highly polar organic solvent generally has a high boiling point; N,N-dimethylformamide has a boiling point of 153° C., whereas N-methylpyrrolidone has a boiling point of 202° C., for example. When such a highly polar organic solvent is used, removal of the solvent is often a problem. Given these circumstances, the inventor of the present invention also studied removal of the organic solvent by solid phase extraction using a C18 column or the like. However, the organic solvent with a high concentration hinder the hydrophobic interaction between ligands of a chelating agent-drug complex and a solid phase to hinder retention in the column, and thus it was difficult to separate the organic solvent by solid phase extraction. Although the highly polar organic solvent can be removed using high performance liquid chromatography (HPLC), there was a problem in that it not only required dedicated equipment but also took time for separation.

The inventor of the present invention conducted various experiments and studies on organic solvents other than the highly polar organic solvent and devised a method using an organic solvent having water miscibility with moderate polarity in the reaction of $^{89}Zr$ and DOTA. The organic solvent with moderate polarity generally has a low boiling point and can easily be removed by evaporation. Furthermore, the inventor of the present invention has found out from the experiments that the concentration of the organic solvent is preferably 40 to 90% by volume and the reaction temperature is preferably 80° C. or more. With this, reactivity equal to that of DMSO described above can be obtained. The inventor of the present invention has also found out that methanol ($CH_3OH$), ethanol ($C_2H_5OH$), and the like are preferred as the organic solvent having water miscibility with moderate polarity.

That is, the inventor of the present invention first studied a factor responsible for the low yield of the complex of DOTA and zirconium ions in water. As described above, in the reaction of DOTA and metal ions, an intermediate state complex with the structure indicated on the left side of Reaction Formulae (301a) and (301b) is taken. The intermediate state complex is a complex in which two of the cyclic amines on a diagonal line are protonated, four carboxylic acids coordinate to the metal, and a plurality of water molecules coordinate to the metal. Then by desorbing the protons on the amine and the water coordinating to the metal ion by heating, $^{89}Zr$ is bound to DOTA as indicated on the right side of Reaction Formula (301a). However, $^{89}Zr$ tends to generate a hydroxide, and thus it is considered that $^{89}Zr$ is desorbed from DOTA to easily become zirconium hydroxide by the reaction indicated in Reaction Formula (301b), resulting in the lowered radiochemical yield.

The inventor of the present invention then studied a factor improving the yield of Zr by a mixture solvent in which an organic solvent and water are mixed together. As described above, the inventor of the present invention expected that the water molecules coordinating to zirconium in the intermediate state complex would hinder the reaction to form the complex. Thus, the inventor of the present invention considered that by replacing the coordination of the water molecules by the coordination of an organic solvent L as indicated in Reaction Formula (302a) below, the generation of zirconium hydroxide indicated in Reaction Formula (302b) would be inhibited, and the yield was able to be increased. Thus, the inventor of the present invention thought of a method of mixing the organic solvent with a reaction solution in the synthesis of zirconium.

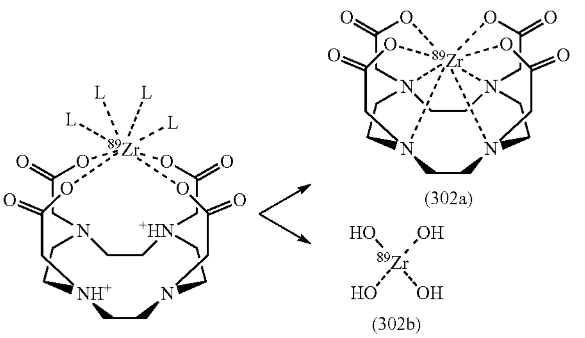

(302a)

(302b)

(L is an Organic Solvent)

Based on the above studies, the inventor of the present invention studied various organic solvents. That is, the inventor of the present invention set the concentration at 50% by volume in the various organic solvents and compared the yield when DOTA and radioactive zirconium were reacted in this solution with a reaction temperature of 100° C. and a reaction time of 30 minutes. Consequently, it was found out that the yield greatly varied depending on the type of the organic solvents. Furthermore, it was confirmed that the organic solvent with higher polarity tended to give a higher yield. Thus, the inventor of the present invention expected that the organic solvent with stronger affinity with zirconium would be more likely to hinder the hydration of zirconium and thus inhibit the generation of zirconium hydroxide. On the other hand, in the case of the organic solvent with a low degree of polarity, it was expected that it would be inferior in affinity with zirconium to the highly polar one and thus have a smaller effect of hindering the hydration of zirconium and that it would be inferior in the yield as well. Although a particularly good radiochemical yield was obtained in the highly polar organic solvent such as DMSO, DMF, or NMP with a dipole moment of 3.0 D or more, it was found out that a relatively good radiochemical yield was obtained even with an organic substance with moderate polarity with a dipole moment of less than 3.0 D (hereinafter, a moderately polar organic solvent), or the moderately polar organic solvent having water miscibility such as methanol or ethanol.

Figure 5:
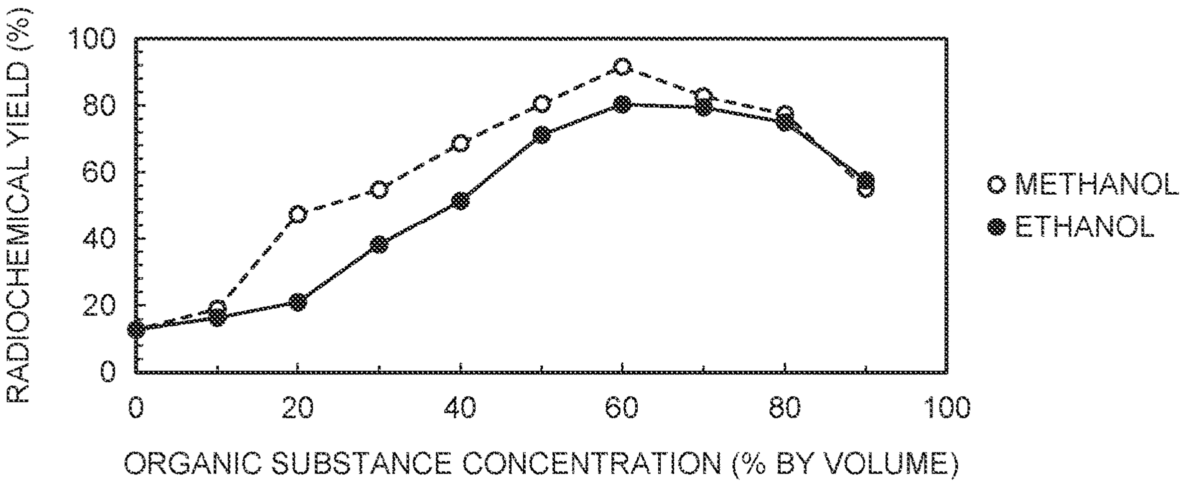
FIG. 5 is a graph illustrating the dependence of the radiochemical yield of zirconium on an organic substance concentration according to the one embodiment of the present invention.

The inventor of the present invention also studied a method for compensating for the low affinity of the moderately polar organic solvent to zirconium with concentration. That is, a method of using the moderately polar organic solvent with high concentrations was studied. FIG. 5 is a graph illustrating a relation between the concentration of the moderately polar organic solvent and the yield. As illustrated in FIG. 5, it was confirmed that the yield was improved by making the organic solvent concentration higher concentrations, and the yield became maximum at 60% by volume for both methanol and ethanol. Thus, it was shown that the yield was able to be improved by optimizing the concentration of the moderately polar organic solvent.

Furthermore, the inventor of the present invention performed various experiments to find out that the radiochemical yield of DOTA-$^{89}$Zr varies by a method for purifying $^{89}$Zr. Specifically, when a $^{89}$Zr solution prepared by the method of purification described in Non Patent Literature 1 and Non Patent Literature 2 was used, the yield was extremely low. On the other hand, it was found out that when a $^{89}$Zr solution purified by the method described in Patent Literature 2 was used, the yield was high.

Given these circumstances, the inventor of the present invention earnestly studied the difference in the yield to find out that it is caused by an oxalic acid concentration contained in the purified $^{89}$Zr solution. $^{89}$Zr is first roughly purified as an oxalic acid solution using a hydroxamic acid resin and is then replaced by a hydrochloric acid solution using an anion exchange resin. In the method described in Non Patent Literature 1 and Non Patent Literature 2, the anion exchange resin to which $^{89}$Zr adsorbs is washed with purified water, and then $^{89}$Zr is eluted with hydrochloric acid with a concentration of 1 mol/L. However, according to analysis performed by the inventor of the present invention, oxalic acid of the order of $10^{-3}$ mol/L is dissolved in the $^{89}$Zr solution eluted by the method described in Non Patent Literature 1 and Non Patent Literature 2. On the other hand, in the method described in Patent Literature 2, the anion exchange resin is washed with diluted hydrochloric acid before eluting $^{89}$Zr, whereby the oxalic acid concentration can be reduced; specifically, it was confirmed that the dissolved oxalic acid concentration was able to be reduced to the order of $10^{-6}$ mol/L.

Figure 2:
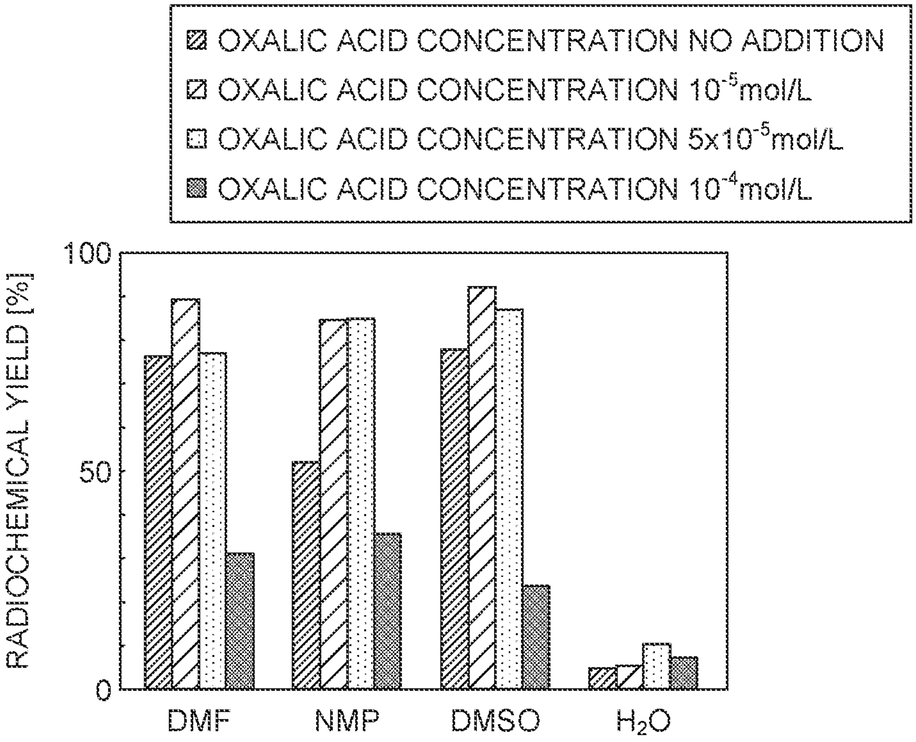
FIG. 2 is a graph illustrating an influence of oxalic acid on the radiochemical yield of a $^{89}$Zr-DOTA-containing PET probe in accordance with the oxalic acid concentration.

Subsequently, the inventor of the present invention studied an influence of the oxalic acid concentration on the radiochemical yield. As the drug, DOTA and a DOTA-containing PET probe (product name: PSMA-617, for example) were used. The purified $^{89}$Zr solution was prepared using the method described in Patent Literature 2, and oxalic acid was further added thereto to adjust the oxalic acid concentration. The results are illustrated in FIG. 1 and FIG. 2. FIG. 1 is a graph illustrating an influence of oxalic acid on the radiochemical yield of DOTA-$^{89}$Zr in accordance with the oxalic acid concentration, whereas FIG. 2 is a graph illustrating an influence of oxalic acid on the radiochemical yield of a $^{89}$Zr-DOTA-containing PET probe in accordance with the oxalic acid concentration.

From FIG. 1 and FIG. 2, the inventor of the present invention has found out that there is a preferable oxalic acid concentration in terms of the oxalic acid concentration. That is, the inventor of the present invention has found out that the oxalic acid concentration is typically $10^{-5}$ mol/L or more and less than $10^{-4}$ mol/L and preferably suitably $10^{-5}$ mol/L or more and $5\times10^{-5}$ mol/L or less, although it depends on the drug or the solvent. According to studies by the inventor of the present invention, $^{89}$Zr is likely to adhere to a vessel in a condition in which oxalic acid is not added, and thus it is assumed that when the oxalic acid concentration is low, zirconium hydroxide is likely to be generated. On the other hand, the inventor of the present invention has also found out that when the oxalic acid concentration is high, although adhesion of $^{89}$Zr to the vessel hardly occurs, a reaction rate reduces. It is considered that this is because although oxalic acid and $^{89}$Zr form a complex to inhibit generation of the hydroxide, complex formation with the drug such as DOTA is hindered. Consequently, an oxalic acid concentration that does not hinder the reaction with DOTA while inhibiting generation of the hydroxide is preferred; it is considered that the range of this oxalic acid concentration is $10^{-5}$ mol/L or more and less than $10^{-4}$ mol/L and suitably $10^{-5}$ mol/L or more and $5\times10^{-5}$ mol/L or less described above.

Although the dependence of the radiochemical yield on the oxalic acid concentration is small in the case of the highly polar organic substance such as DMSO or DMF, the oxalic acid concentration dependence is large in the case of the moderately polar organic substance such as methanol (MeOH) or ethanol (EtOH). Furthermore, a preferred oxalic acid concentration is a relatively high concentration in the moderately polar substance compared to the highly polar substance. It is considered that this is because the highly polar substance coordinates to $^{89}$Zr in the same manner as oxalic acid and inhibits hydroxylation. That is, it was confirmed that also by controlling the oxalic acid concentration in the reaction solution, radioactive zirconium and DOTA were able to be reacted with a high yield using the moderately polar organic solvent.

Such an effect could also be obtained with a zirconium-binding organic substance (such as citric acid or ascorbic acid). The appropriate concentration range may vary from substance to substance. In the experiment of organic solvent concentration dependence described above, it is assumed that the oxalic acid was present with the concentration of about $10^{-6}$ to $10^{-5}$ mol/L.

Conventionally, the complex formation reaction between DOTA and metal ions has been considered to be rate-determined by the deprotonation of the cyclic tertiary amine of DOTA. That is, when the cyclic tertiary amine is protonated, although the intermediate complexes indicated on the left side of Chemical Formulae (302), (302a), and (302b) can be formed, the final products indicated on the right side cannot be reached. Thus, the deprotonation reaction of the cyclic tertiary amine rate-determines the complexation reaction. Assuming this mechanism, it is considered that the yield of the radioactive zirconium DOTA complex improves by a decrease in the pKa of the amine. Organic solvents are generally less polar than water and thus have the effect of inhibiting ionization of organic compounds, that is, protonation of amino groups or deprotonation of carboxylic acids. This may reduce the acid dissociation constant pKa of the protonated amino group of the reaction intermediate complex and promote the reaction to change it into the target complex. That is, based on the hypothesis that the generation of zirconium hydroxide takes precedence over the reaction with DOTA when $^{89}$Zr is hydrated, the inventor of the present invention assumed that the highly polar organic solvent would coordinate to zirconium in preference to water and inhibit hydration, thus improving the yield. The inventor of the present invention has further found out that the moderately polar organic solvent, while having a low ability to coordinate to zirconium, can coordinate to zirconium in preference to water by increasing its concentration to inhibit hydration, thus improving the yield. Furthermore, it is considered that the fact that the yield of the target complex improves by adding a minute amount of a substance with a strong ability to coordinate to zirconium such as oxalic acid also indicates that the hydration hindrance of zirconium contributes to the promotion of the reaction of DOTA and radioactive zirconium. The present invention and the one embodiment thereof described in the following have been devised through the foregoing earnest studies by the inventor of the present invention.

As an alternative to DOTA described above, a tricyclic such as NOTA indicated by General Formula (2) below or the like may be used. That is, the earnest studies by the inventor of the present invention described above can be discussed in the same manner even when DOTA is replaced by NOTA.

(2)

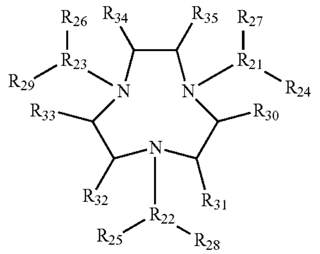

In General Formula (2), $R_{21}$, $R_{22}$, and $R_{23}$ are each hydrogen (—H) (in this case, none of $R_{24}$ to $R_{29}$ is further connected), a —CH— group, a $—(CH_2)_nCH—$ group, a $—N(=O)(CH_2)_nNCH—$ group, or a $—(CH_2)_nNC(=O)N—$ group. n is an integer of 0 or more. At least two of $R_{24}$, $R_{25}$, $R_{26}$, $R_{27}$, $R_{28}$, $R_{29}$, $R_{30}$, $R_{31}$, $R_{32}$, $R_{33}$, $R_{34}$, and $R_{35}$ are at least two selected from a carboxylic acid, a primary amide, hydroxamic acid, phosphonic acid, phosphoric acid, sulfonic acid, an alcohol, an amine, phenol, aniline, and an ester, a secondary amide, hydroxamic acid, and a phosphate that are each obtained by adding a substituent to the aforementioned, with the residual substituents being each hydrogen, an alkyl chain, a tert-butyl blocked carboxylic acid, nitrobenzene, or a substituent-added alkyl chain. A PET probe or a functional group facilitating bonding of a PET probe is optionally added to a functional group contained in $R_{24}$ to $R_{35}$. The functional group facilitating bonding is the following functional group: a carboxylic acid, a succinimide carboxylate, a tetrafluorophenol carboxylate, an alcohol, an amine, a thiol, an isothiocyanate, maleimide, phenol, aniline, benzoic acid, phenyl isothiocyanate, or an alkyne, an azide, DBCO, BCN, TCO, norbornene, tetrazine, or methyltetrazine, which are each a click chemistry reagent. $R_{24}$ to $R_{35}$ optionally have a structure of the functional group facilitating bonding or a condensed structure of a PET probe and the functional group facilitating bonding.

The functional group described above may have still another compound bonded via an ester bond, an amide bond, or the like or have branching for holding another compound from an alkyl chain. Specific examples include crosslink-forming functional groups such as succinimide, isothiocyanate, an amine, a thiol, and a carboxylic acid and click chemistry-oriented functional groups such as an azide, an alkene, an alkyne, and tetrazine. Furthermore, a drug for use in molecular imaging may be bonded via these crosslink-forming functional groups.

For each of $R_{21}$ to $R_{23}$, the structure represented by General Formula (3) below may be employed; specifically, one selected from the structures represented by Chemical Formulae (3-1) to (3-4) can be employed. Note that n in Chemical Formulae (3-2) to (3-4) is an integer of 0 or more.

(3)

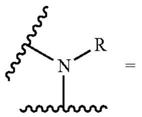

(3-1)

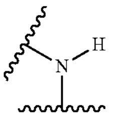

(3-2)

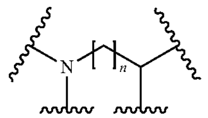

(3-3)

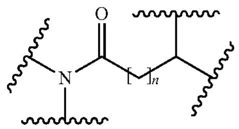

(3-4)

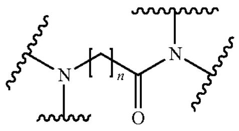

For each of $R_{24}$ to $R_{29}$, one selected from the structures represented by General Formulae (4) to (21) below can be employed. Note that n in General Formulae (4) to (21) is an integer of 0 or more. For each of $R_5$ to $R_{20}$, one selected from the structures represented by General Formulae (22) to (26) below can be employed. The structures represented by General Formulae (22) to (26) are structures that do not form any complex with a metal ion or are hard to form a complex therewith. In any of $R_{24}$ to $R_{35}$ in General Formula (2), a molecular probe may be bonded via at least one structure selected from the group consisting of Chemical Formulae (16) to (21) and (26), or a linker may be bonded to a molecular probe via at least one structure selected from the group consisting of Chemical Formulae (16) to (21) and (26).

(4)

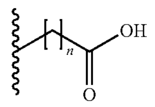

(5)

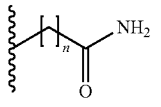

-continued (6)

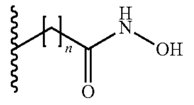

(7)

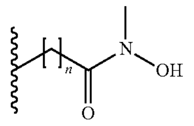

(8)

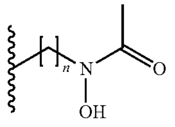

(9)

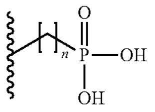

(10)

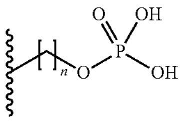

(11)

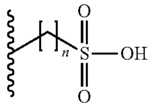

(12)

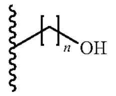

(13)

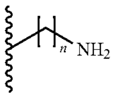

(14)

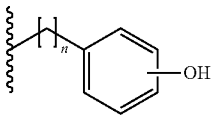

(15)

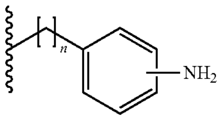

(16)

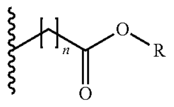

(17)

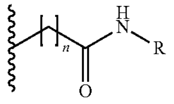

(18)

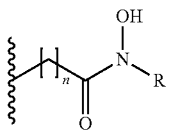

-continued (19)

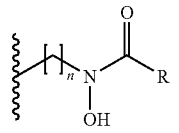

(20)

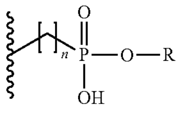

(21)

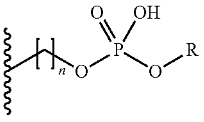

(22)

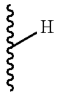

(23)

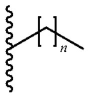

(24)

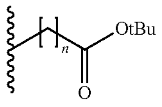

(25)

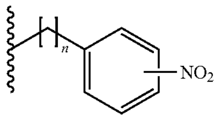

(26)

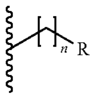

A complex of NOTA or a derivative of NOTA and a drug such as an antibody, a protein, a peptide, or a low-molecular weight organic compound as an object of a molecular imaging experiment can also be used. For the protein or the peptide, one including a natural amino acid, a non-natural amino acid, or both the natural amino acid and the non-natural amino acid and having a linear-chain structure or a cyclic structure can be employed. Specifically, a method amidating one carboxylic acid in the structure of NOTA and crosslinking it with the drug and a substance obtained through crosslinking from a cyclic alkyl chain in the structure of NOTA are known. Bonding may be performed by interposing an appropriate linker such as polyethylene glycol between NOTA and the drug. Specifically, it has been used for high-molecular drugs such as antibodies and low-molecular drugs such as PSMA-617. The linker is typically, but is not necessarily limited to, polyethylene glycol, an alkyl chain, piperazine, or a complex of polyethylene glycol, an alkyl chain, or piperazine. In the present invention, the substance as an object of bonding is not limited to NOTA and also includes derivatives thereof and complexes with drugs. That is, for R in each of General Formulae (16) to (21) and (26) described above, one selected from the structures represented by Chemical Formulae (27) to (47) below can be employed. $^{89}Zr$ may be complexed in the NOTA structure after bonding the drug to R or the drug may be bonded to R after complexing $^{89}Zr$.

(27)
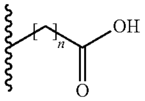
(28)
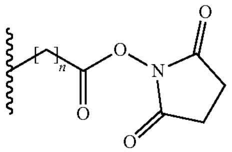
(29)
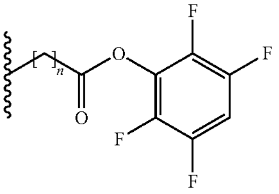
(30)
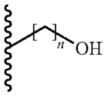
(31)
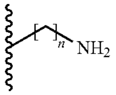
(32)
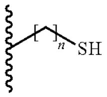
(33)
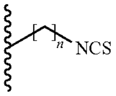
(34)
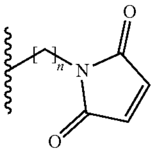
(35)
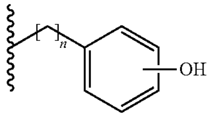
(36)
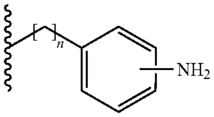
(37)
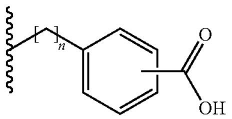
(38)
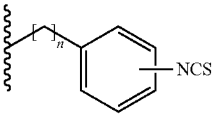
-continued
(39)
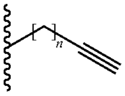
(40)
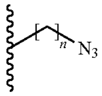
(41)
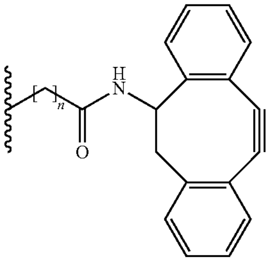
(42)
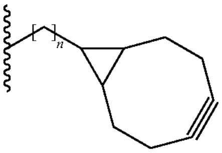
(43)
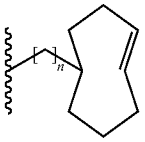
(44)
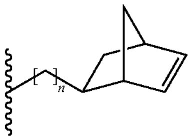
(45)
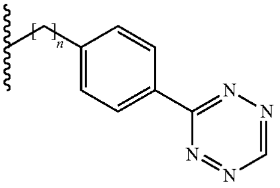
(46)
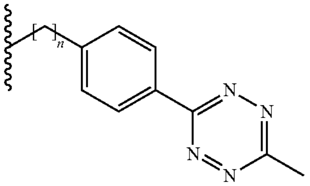
(47)
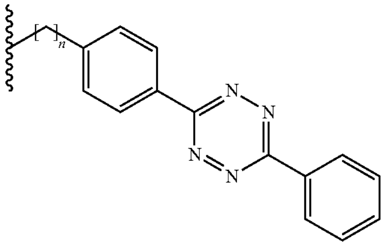

In General Formulae (1) and (2) described above, in any of $R_5$ to $R_{20}$ in General Formula (1) and any of $R_{24}$ to $R_{35}$ in General Formula (2), a molecular probe of the structures represented by Chemical Formulae (61) to (64) below may be bonded, or a linker of the structures represented by Chemical Formulae (71) to (74) below may be bonded to the molecular probe.

(61)

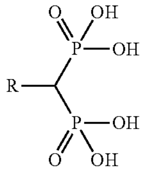

(62)

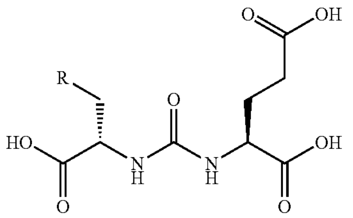

(63)

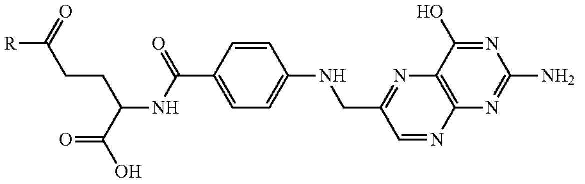

(64)

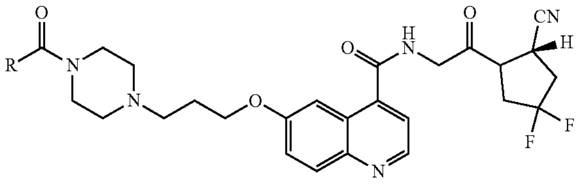

(71)

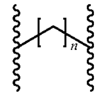

(72)

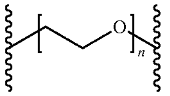

(73)

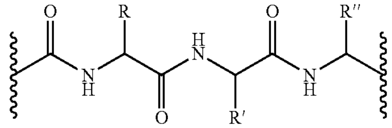

(74)

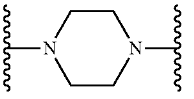

For DOTA represented by General Formula (1), the structures reacted as in Reaction Formulae (1-1) to (1-13) below can also be employed. In Reaction Formulae (1-1) to (1-13), represented in the order from the left are a DOTA derivative, a substance desired to be bonded (written above the arrow), and a structure after condensation. Reaction Formulae (1-11) to (1-13) are click chemistry-oriented methods of bonding.

(1-1)

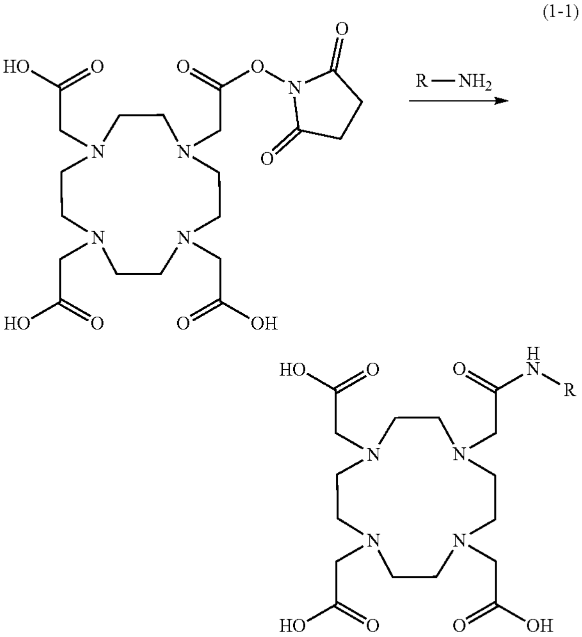

(1-2)

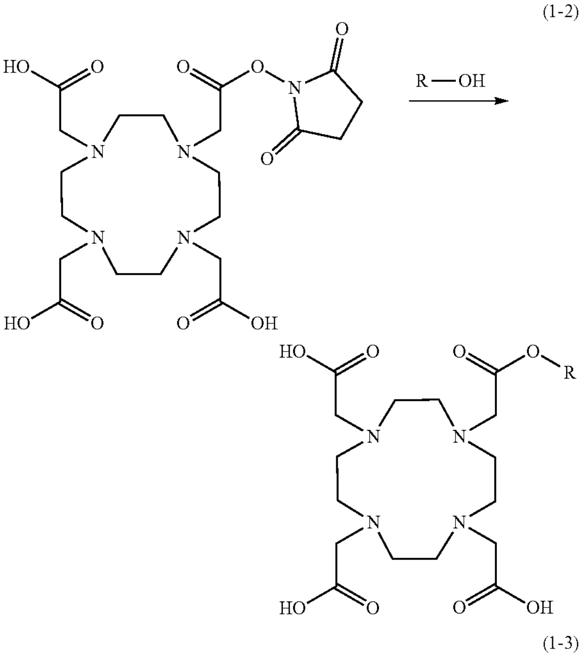

(1-3)

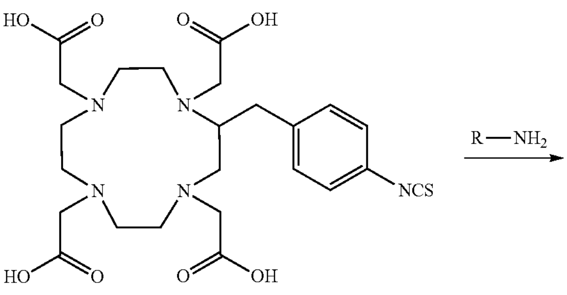

-continued
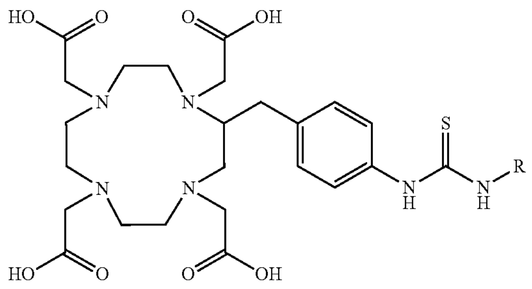
(1-4)
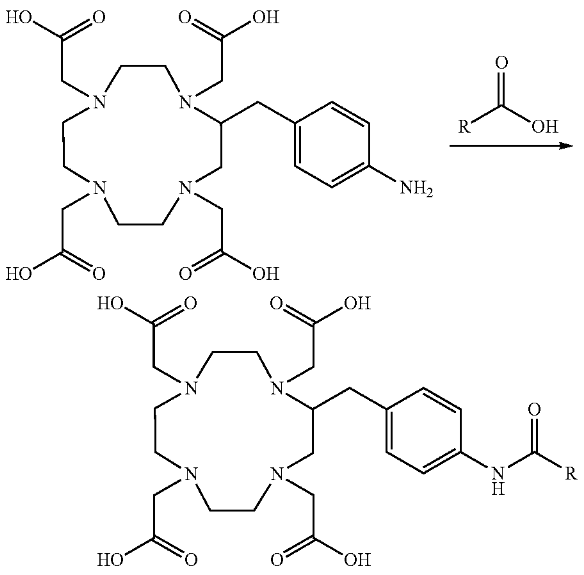
(1-5)
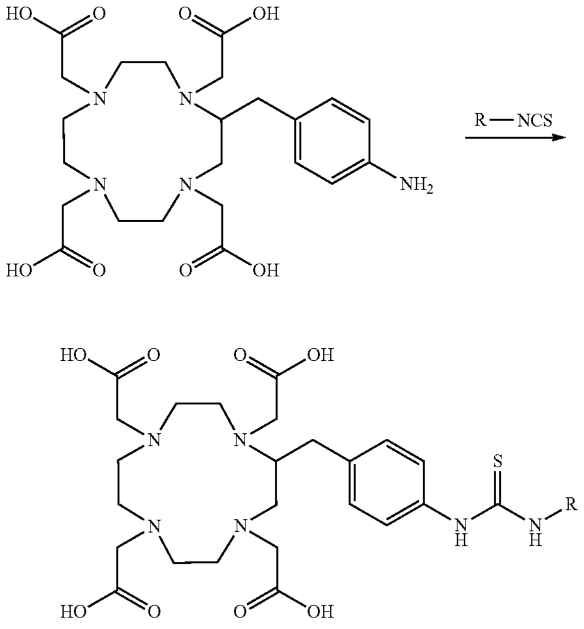
-continued
(1-6)
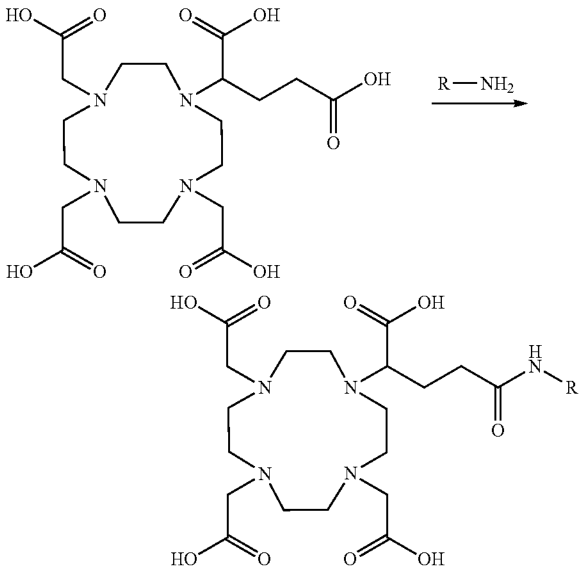
(1-7)
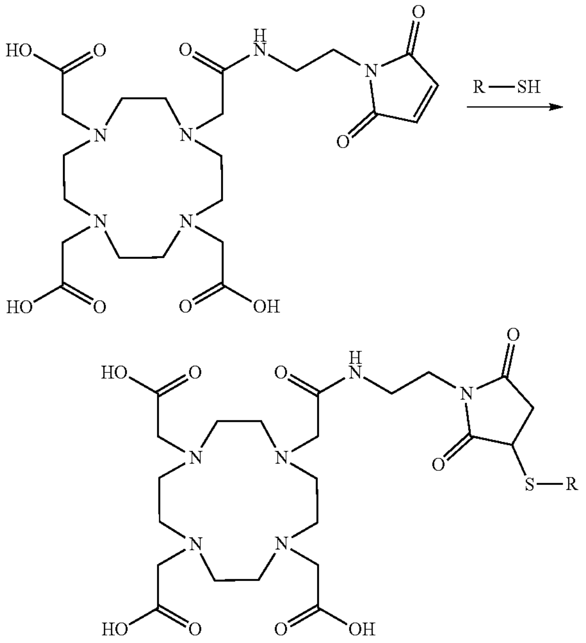
(1-8)
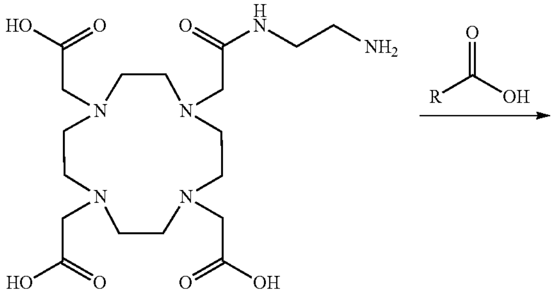

-continued
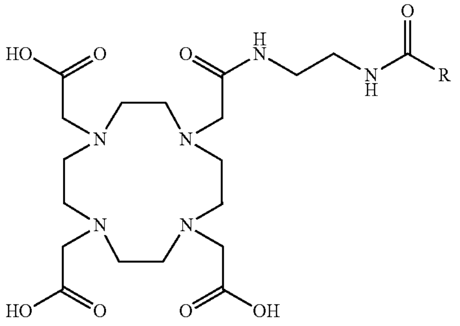
(1-9)
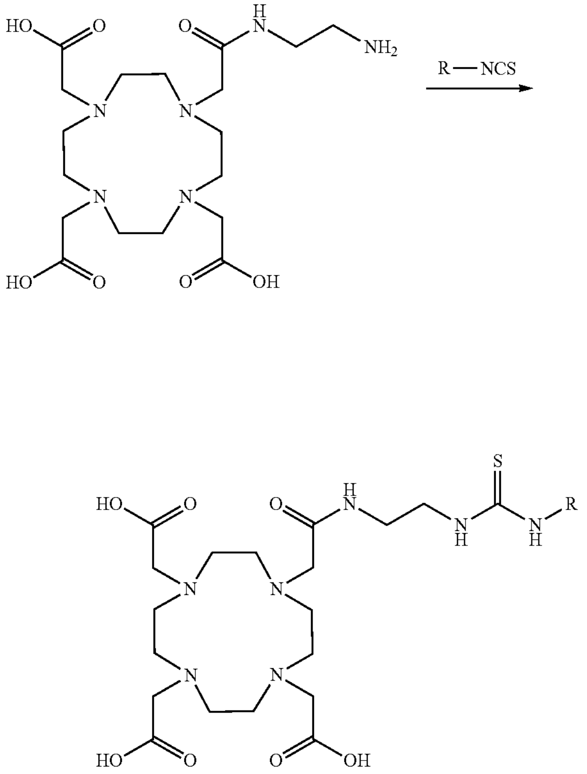
(1-10)
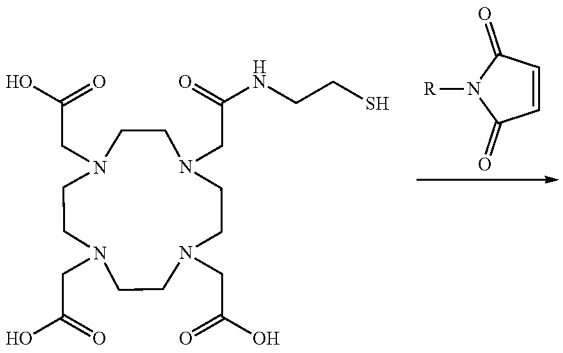
-continued
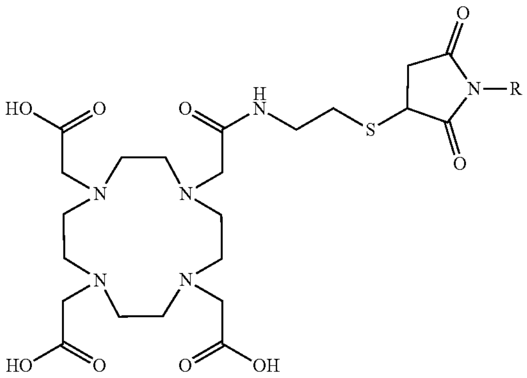
(1-11)
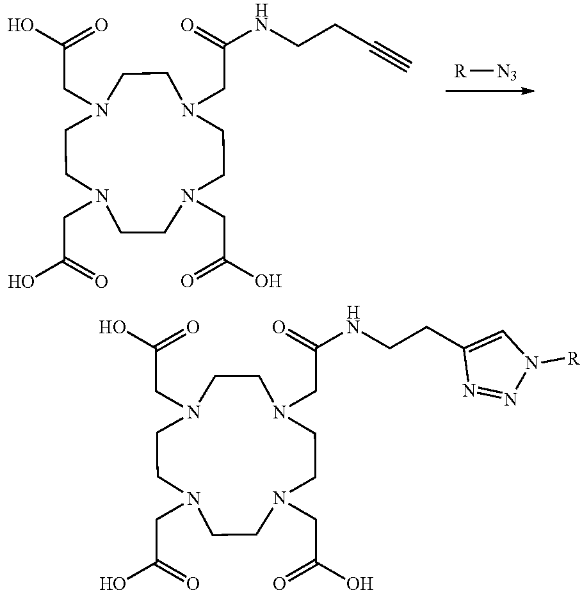
(1-12)
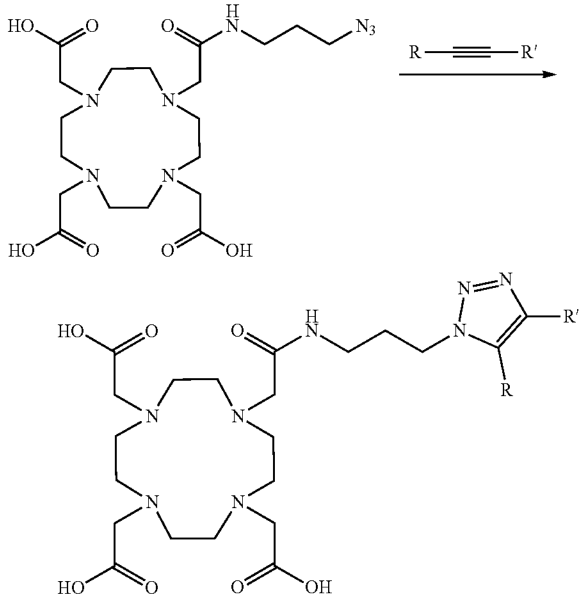

-continued (1-13)

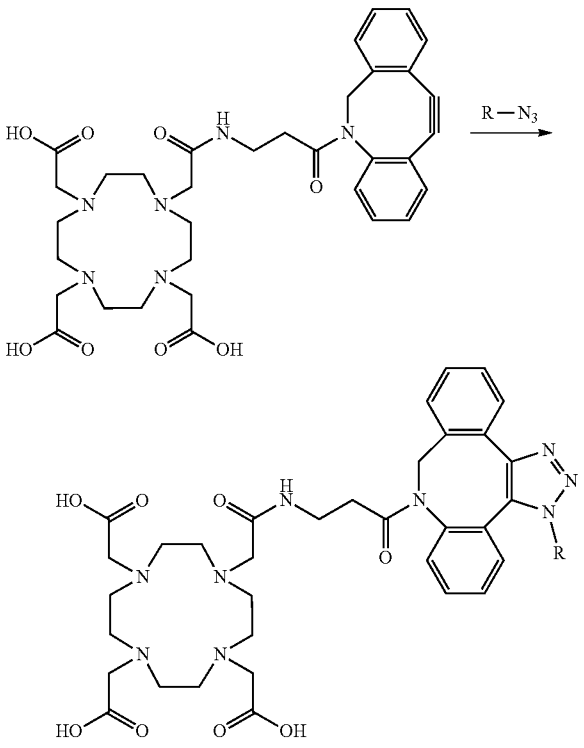

For NOTA represented by General Formula (2), the structures reacted as in Reaction Formulae (2-1) to (2-13) below can be employed. In Reaction Formulae (2-1) to (2-13), represented in the order from the left are a NOTA derivative, a substance desired to be bonded (written above the arrow), and a structure after condensation. Reaction Formulae (2-11) to (2-13) are click chemistry-oriented methods of bonding.

(2-1)

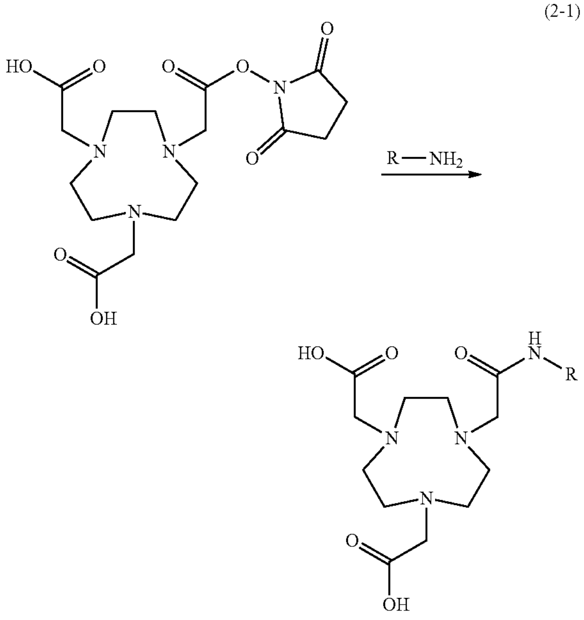

-continued (2-2)

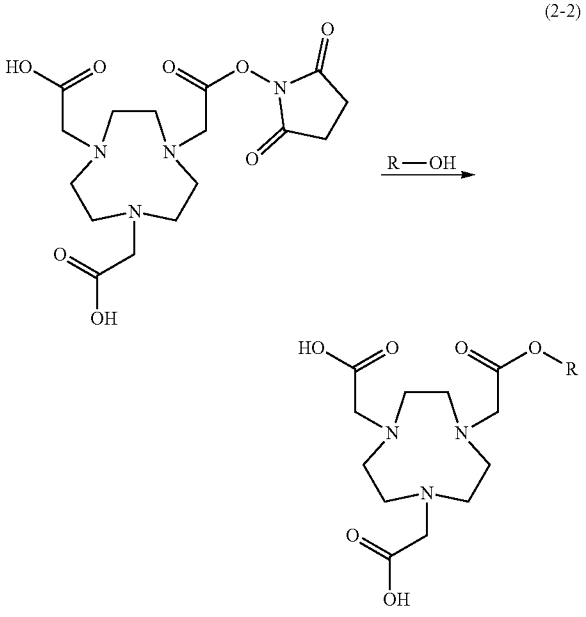

(2-3)

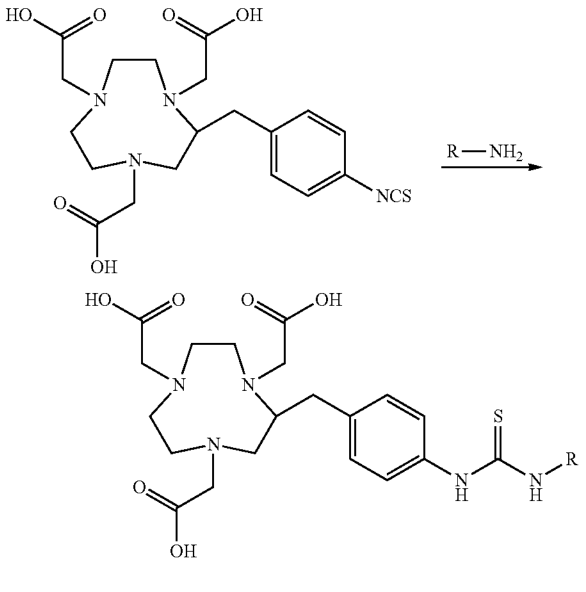

(2-4)

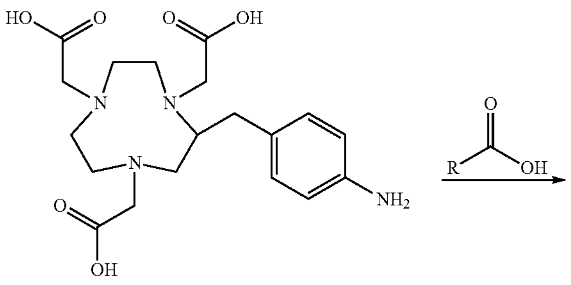

-continued
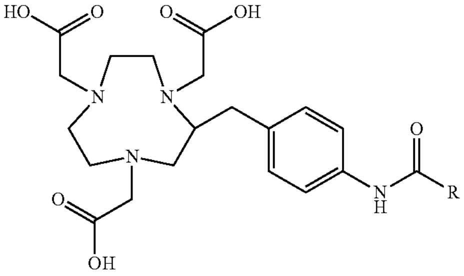
(2-5)
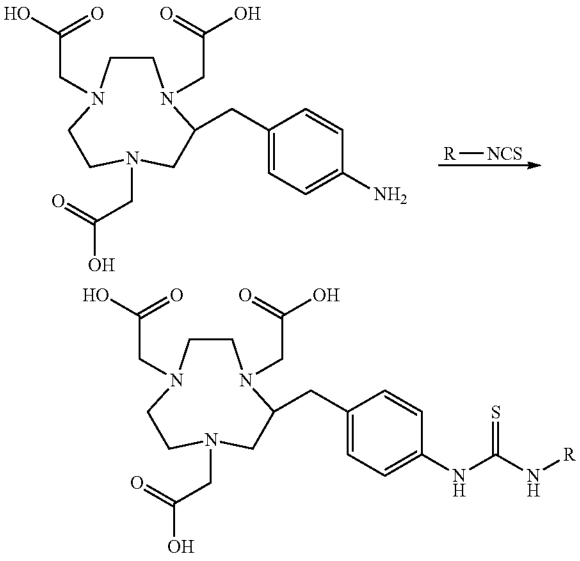
(2-6)
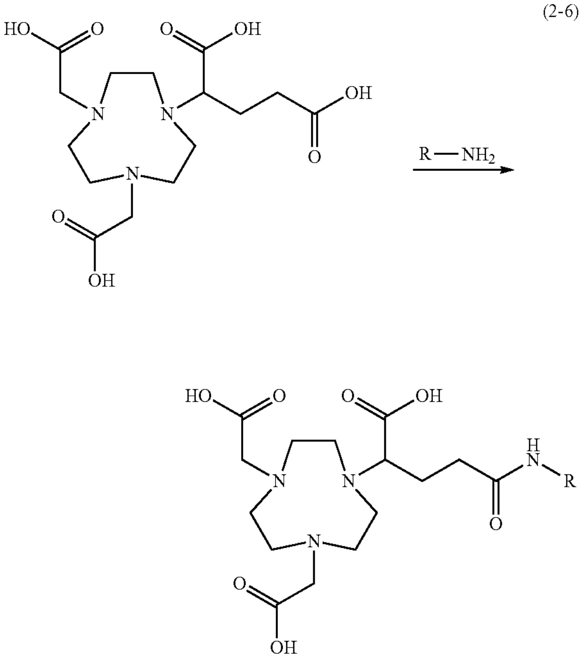
-continued
(2-7)
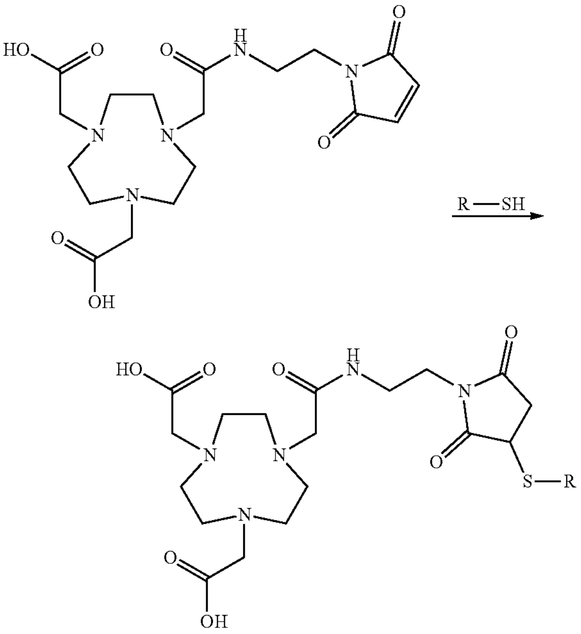
(2-8)
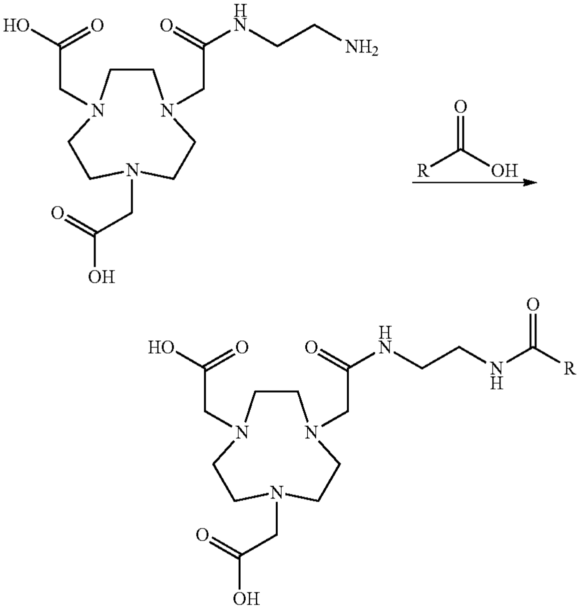
(2-9)
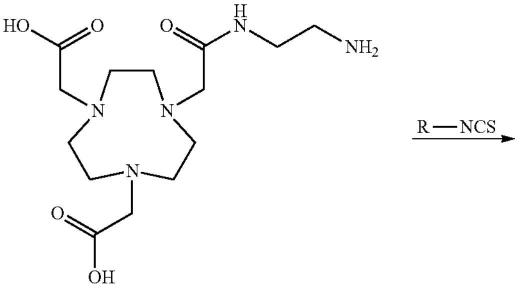

-continued

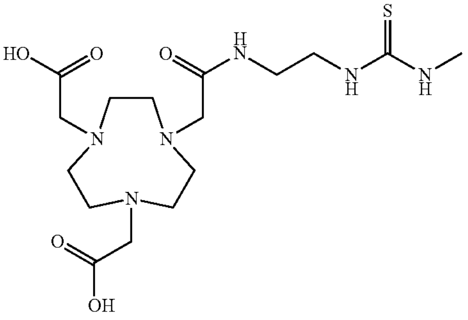

(2-10)

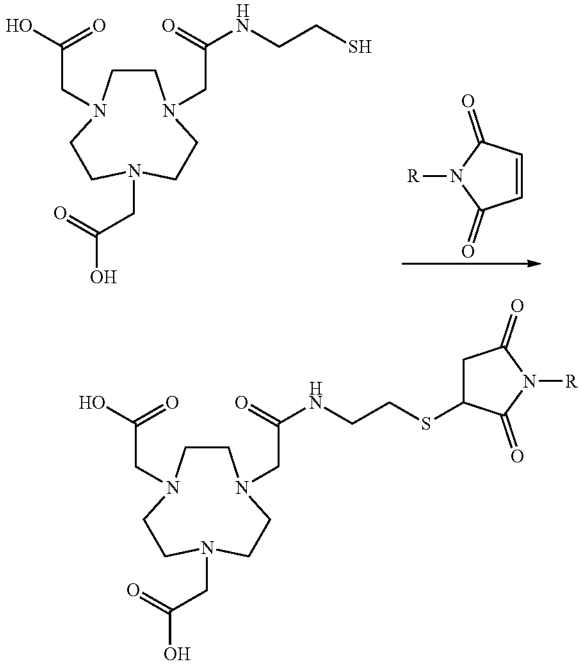

(2-11)

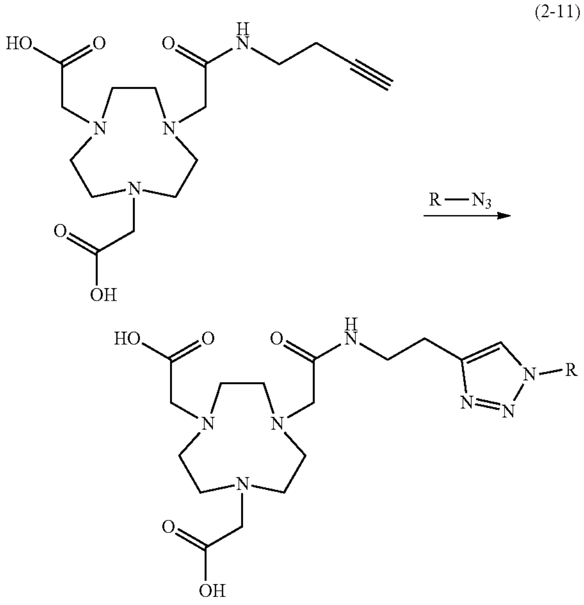

-continued (2-12)

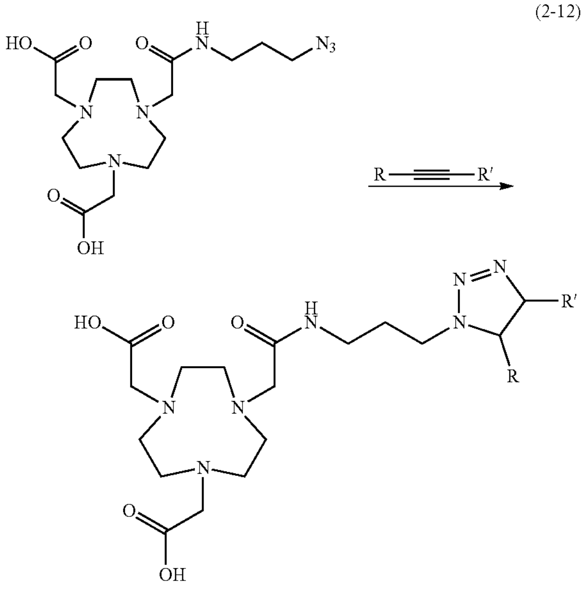

(2-13)

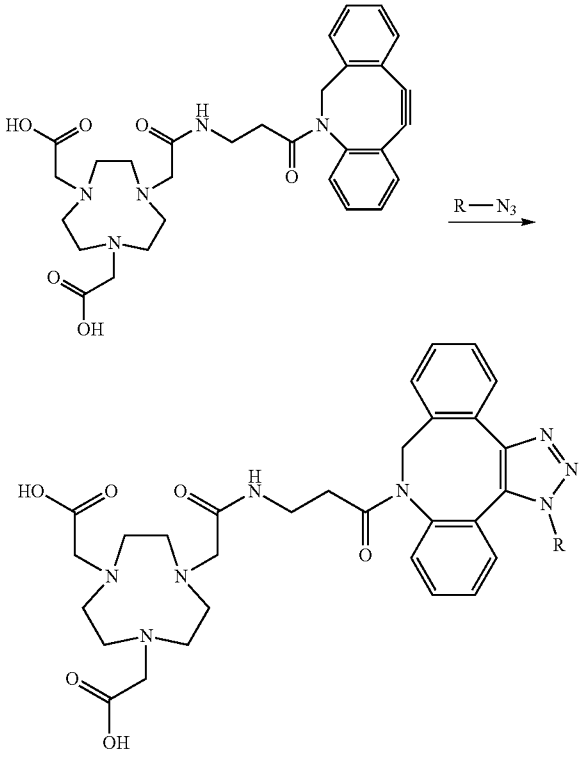

Embodiment

Figure 3:
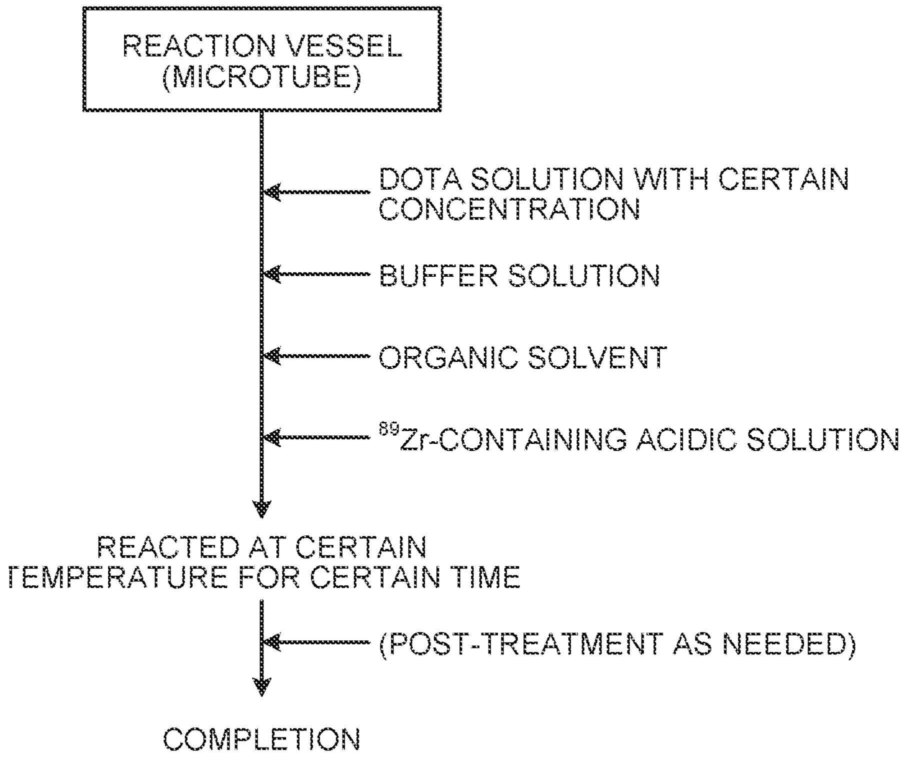
FIG. 3 is a diagram for illustrating an example of a specific method for performing a reaction of zirconium and DOTA according to one embodiment of the present invention.

The following describes a method for synthesizing a zirconium complex according to one embodiment of the present invention. FIG. 3 is a diagram of an example of a specific method for performing a reaction of zirconium and DOTA according to this embodiment.

As illustrated in FIG. 3, first, a DOTA solution in which a compound containing DOTA is dissolved as a chelating agent solution with a certain concentration is introduced to a microtube as a reaction vessel. For DOTA as the chelating agent, 1,4,7,10-tetraazacyclododecane-1,4,7,10-tetraacetic acid was used. The concentration of the DOTA solution is $10^{-7}$ mol/L or more and less than $10^{-4}$ mol/L. In the present embodiment, a final concentration of the DOTA solution is $10^{-5}$ mol/L, for example, and an introduction amount is 1 μL for a solution with a concentration of $10^{-2}$ mol/L, for example. Next, a substantially neutral buffer solution is introduced to the microtube. As a final buffer solution, 4-(2-hydroxyethyl)-1-piperazineethanesulfonic acid (HEPES) with a concentration of about 0.25 mol/L and a pH of 7.0 is used, for example. An introduction amount thereof is 449 μL for a solution with a concentration of 0.5 mol/L, for example. The buffer solution used in the present embodiment is a buffer solution with metal ions as impurities other than $^{89}Zr$ removed by a metal removing agent in advance. Thus, a possibility of metal ions such as $Fe^{3+}$, $Ti^{4+}$, and $Y^{3+}$ as impurities mixing into a reaction solution to be finally mixed can be reduced.

Next, an organic solvent containing an organic substance having water miscibility is introduced to the microtube. Specifically, in the present embodiment, an organic solvent containing methanol or ethanol, for example, is used as the organic substance. The following describes a relation between the concentration of the organic solvent containing methanol or ethanol and the radiochemical yield of zirconium. FIG. 5 is a graph illustrating the dependence of the radiochemical yield of zirconium on the concentration of the organic solvent containing methanol or ethanol.

From FIG. 5, the radiochemical yield can be improved compared to the case in which the organic solvent is not mixed by making the organic solvent concentration greater than 0% by volume and 1% by volume or more. It can also be seen from FIG. 5 that the radiochemical yield of $^{89}Zr$ peaks when the concentration is 60% by volume. It can also be seen from FIG. 5 that to make the radiochemical yield of $^{89}Zr$ 50% or more, for example, preferred is 20% by volume or more for methanol as the organic solvent and 40% by volume or more for ethanol. Furthermore, based on FIG. 5, the concentration of the organic substance in the organic solvent can be selected in accordance with a required radiochemical yield in $^{89}Zr$. That is, the concentration of the organic substance having water miscibility in the organic solvent is preferably 40% by volume or more and more preferably 50% by volume or more from the viewpoint of producing an effect of improving the radiochemical yield. When the organic substance is greater than 95% by volume, the reaction rate reduces, and thus the concentration of the organic substance is desirably 95% by volume or less, and when considering the radiochemical yield, it is more preferably 80% by volume or less and even more preferably 70% by volume or less. An introduction amount of the organic solvent is 600 μL for an organic solvent with a final concentration of 60% by volume, for example. The order of introducing the DOTA solution, the buffer solution, and the organic solvent to the microtube is not limited to the order described above, and they can be introduced in various orders.

After the DOTA solution, the buffer solution, and the organic solvent have been introduced to the microtube, an acidic solution containing $^{89}Zr$ (a $^{89}Zr$-containing acidic solution) is introduced to the reaction solution within the microtube to generate a mixed solution within the microtube. In the present embodiment, the acidic solution is preferably a solution of a strong acid and is specifically preferably hydrochloric acid (HCl). However, the acidic solution is not necessarily limited to the strong acidic solution such as hydrochloric acid. An introduction amount of the acidic solution containing $^{89}Zr$ is 50 μL, for example.

Depending on the method of purification, there may be a minute amount of oxalic acid remaining in the $^{89}Zr$-containing acidic solution. In this case, the yield can further be improved by controlling the concentration of the remaining oxalic acid. Specific examples include a method adjusting a mixing ratio with a reaction solvent including a mixed solution of a HEPES buffer solution and the organic solvent in accordance with the oxalic acid concentration of the $^{89}Zr$-containing acidic solution and a method adding an oxalic acid solution.

Figure 6:
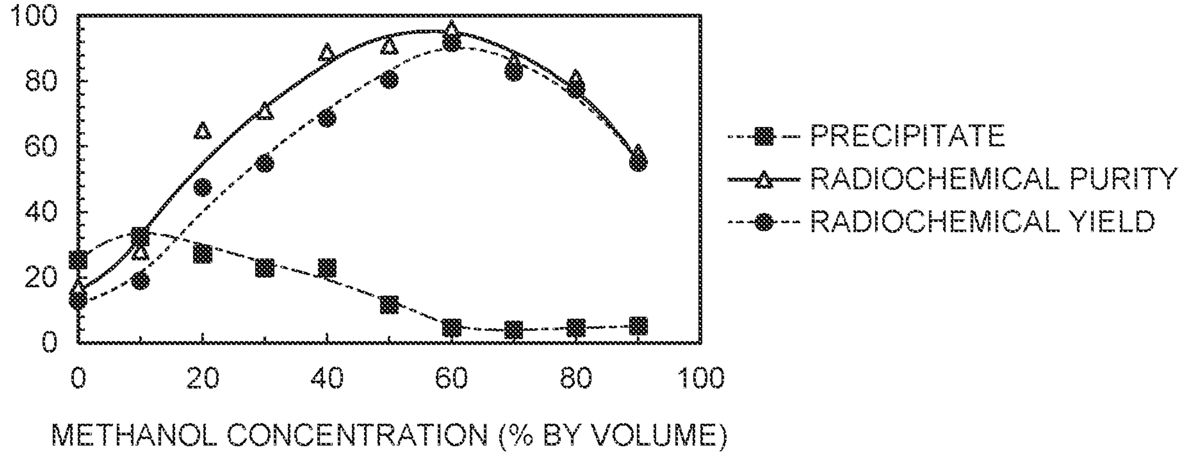
FIG. 6 is a graph illustrating the dependence of a precipitate generation rate, radiochemical purity, and a radiochemical yield on a methanol concentration in the generation of a zirconium complex according to the one embodiment of the present invention.
Figure 7:
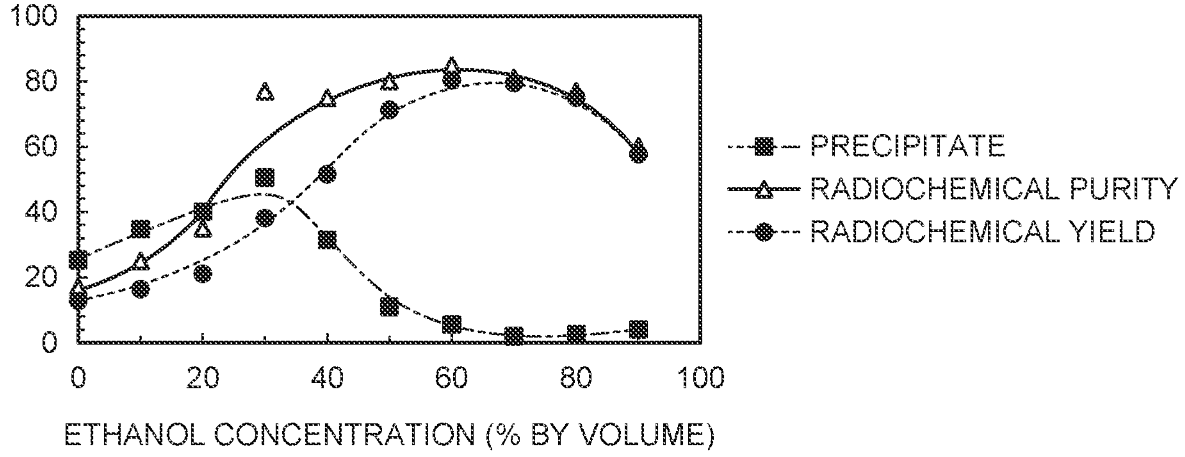
FIG. 7 is a graph illustrating the dependence of the precipitate generation rate, the radiochemical purity, and the radiochemical yield on an ethanol concentration in the generation of the zirconium complex according to the one embodiment of the present invention.

FIG. 6 and FIG. 7 are graphs illustrating the dependence of a precipitate generation rate, radiochemical purity, and a radiochemical yield on a methanol concentration and an ethanol concentration, respectively, in the generation of a zirconium complex. That is, when methanol is used as the organic substance having water miscibility, the methanol concentration of the organic solvent can be selected based on the graph illustrated in FIG. 6. When ethanol is used as the organic substance having water miscibility, the ethanol concentration of the organic solvent can be selected based on the graph illustrated in FIG. 7. In these cases, the concentration of the organic substance in the organic solvent can be selected to be a concentration so as to make precipitate adhering to the microtube or the like at a desired generation rate or less or a concentration giving a desired radiochemical purity.

Referring back to FIG. 3, after the DOTA solution, the buffer solution, the organic solvent, and the $^{89}Zr$-containing acidic solution have been mixed together in the microtube, the mixed solution is heated at a certain temperature and is maintained for a certain time. Thus, DOTA and $^{89}Zr$ react. In the present embodiment, the $^{89}Zr$-containing acidic solution is preferably introduced to the microtube immediately before the heating of the mixed solution. This is because $^{89}Zr$, when left under a neutral condition and at room temperature, undergoes hydroxylation and becomes inactive for the reaction with DOTA. Zirconium hydroxide is a stable compound, and even if temperature is raised thereafter, the reaction of $^{89}Zr$ and DOTA does not proceed. Thus, after $^{89}Zr$ is added, the mixed solution is preferably immediately heated up to the certain temperature to immediately be reacted with DOTA. After $^{89}Zr$ has formed a complex with DOTA, r° Zr does not experience hydroxidation.

In the present embodiment, the certain temperature is preferably 35° C. or more; if the substance bonding to DOTA is a substance resistant to high temperature, the certain temperature may be 70° C. or more, for example, and specifically 80° C., for example. When the heating temperature is set at 80° C. or more, the boiling point of methanol is 68° C., for example, and the temperature may exceed the boiling point of the organic substance contained in the organic solvent. In this case, it is preferable to use a highly sealed container such as a microtube with a screw cap as the microtube. The certain time is about 30 minutes, for example. Thus, the reaction of $^{89}Zr$ and DOTA according to Reaction Formula (401) below ends, and a zirconium complex in which DOTA bonds to $^{89}Zr$ is obtained.

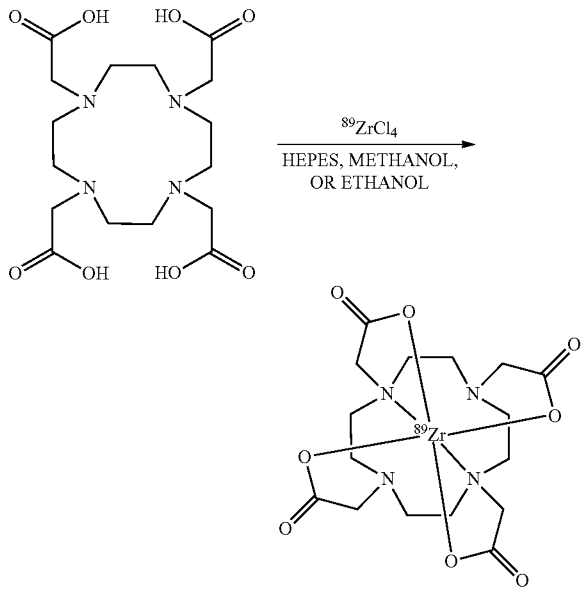

(401)

The acidic solution containing $^{89}Zr$ is strongly acidic, and when it is added to the reaction vessel, there is a possibility of pH significantly changing. For this reason, even after the $^{89}Zr$-containing acidic solution is added to the microtube using a high concentration buffer solution, adjustment is required so as to cause the range of pH to fall under a desired range. That is, after the $^{89}Zr$-containing acidic solution is added, pH is preferably checked using a pH meter, pH test paper, or the like. When a basic solution is added after the $^{89}Zr$-containing acidic solution is added to the microtube, there is a possibility that $^{89}Zr$ will experience hydroxidation in a short time to become inactive for the reaction with DOTA, and thus work of neutralization using the basic solution is preferably avoided. The range of pH is preferably 4 or more and 9 or less, more preferably 5 or more and 9 or less, and even more preferably 6 or more and 8 or less.

After the complex forming reaction of DOTA and $^{89}Zr$, post-treatment is performed as needed. The organic solvent and the buffer solution are removed to be replaced by a physiological saline solution or an ethanol-physiological saline solution mixed solution, for example. In this case, the use of methanol or ethanol as the organic substance shows good reactivity and also facilitates the removal of the organic solvent by drying by evaporation. Examples of methods include solid phase extraction using an ion exchange resin, a C18 column, or a graphite carbon column and separation using a liquid chromatography apparatus; a method suitable for each drug is employed. When solid-phase extraction is used, it is desirable to remove the organic solvent as much as possible by evaporation.

Comparative Example

Figure 4:
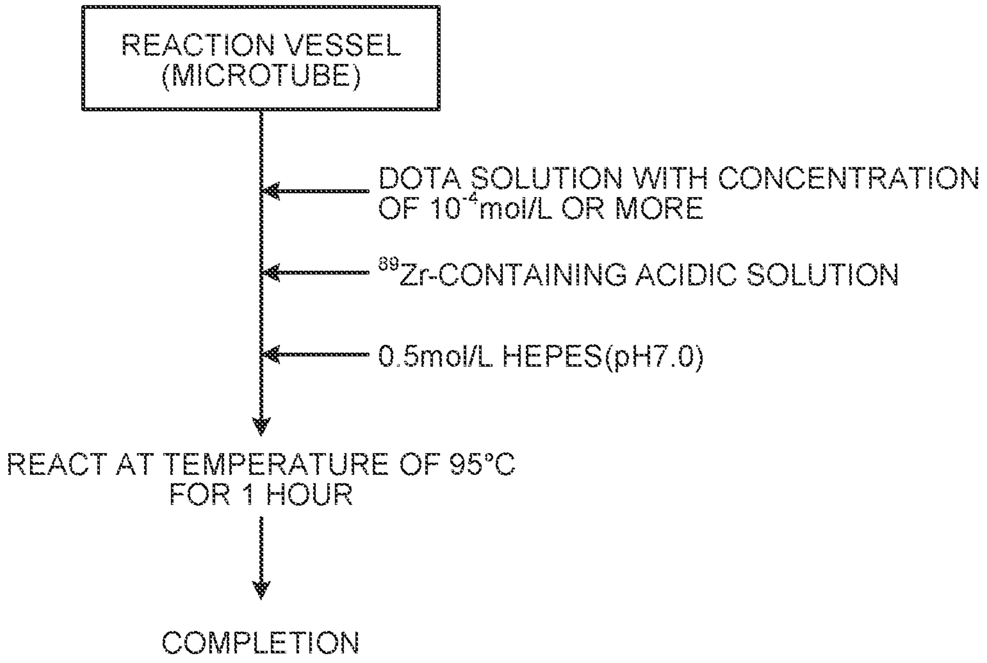
FIG. 4 is a diagram for illustrating a specific method for performing a reaction of zirconium and DOTA according to a conventional technology as a comparative example.

To compare with the foregoing embodiment, the following describes a method for synthesizing a zirconium complex according to a conventional technology as a comparative example. FIG. 4 is a diagram illustrating a specific method for performing a reaction of zirconium and DOTA according to the conventional technology.

As illustrated in FIG. 4, first, a DOTA solution with a concentration of $10^{-4}$ mol/L or more is introduced to a microtube as a reaction vessel. Next, the $^{89}Zr$-containing acidic solution is introduced to the microtube. Next, HEPES with a pH of 7.0 as a substantially neutral buffer solution is introduced to the microtube. Subsequently, they are reacted at a temperature of 80° C., which is 70° C. or more, for about 1 hour to react DOTA and $^{89}Zr$ in accordance with Reaction Formula (402) below. Thus, a zirconium complex in which DOTA bonds to $^{89}Zr$ is obtained.

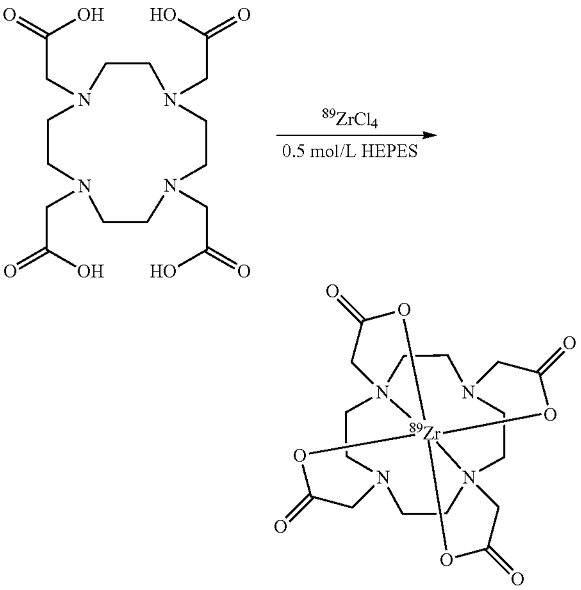

(402)

When the zirconium complex is generated by the method for synthesizing a zirconium complex according to the comparative example, it was confirmed that 90% or more of the dissolved $^{89}Zr$ adhered to the microtube. It was confirmed that about 95% of $^{89}Zr$ dissolved in the reaction solution other than $^{89}Zr$ adhering to the microtube reacted. That is, it is revealed that in the comparative example, the radiochemical yield is about ((1−0.9)x0.95x100=) 9.5% with respect to the original amount of $^{89}Zr$. On the other hand, when the zirconium complex is generated by the method for synthesizing a zirconium complex by the one embodiment described above, it was confirmed that $^{89}Zr$ adhering to the microtube was about 9% of the dissolved $^{89}Zr$. Furthermore, it was confirmed that about 92% of $^{89}Zr$ dissolved in the reaction solution other than $^{89}Zr$ adhering to the microtube reacted. That is, the radiochemical yield is about ((1−0.09)x0.92x100=) 83.7% with respect to the original amount of $^{89}Zr$, which reveals that the radiochemical yield about 8.8 times that of the comparative example can be ensured. In addition, it is revealed that the reaction proceeds in a short reaction time even with a low concentration of DOTA.

As described in the foregoing, the one embodiment of the present invention can synthesize a zirconium complex by reacting DOTA, even with a low concentration of about $10^{-7}$ to $10^{-4}$ mol/L, and $^{89}Zr$ with a high reaction rate of 90% or more.

One embodiment of the present invention has specifically been described; the present invention is not limited to the one embodiment described above and allows various modifications based on the technical thought of the present invention. The values and materials described in the one embodiment described above, for example, are only by way of example; values and materials different therefrom may be used as needed, and the present invention is not limited by the descriptions and the drawings forming part of the disclosure of the present invention by the present embodiment.

Although in the one embodiment described above hydrochloric acid (HCl) is used as the acidic solution, for example, another acidic solution can also be used. In addition, although in the one embodiment described above methanol and ethanol are used as the organic substance having water miscibility, it is not necessarily limited to methanol and ethanol, and aqueous solutions of various organic substances having water miscibility such as various alcohols can be used.

INDUSTRIAL APPLICABILITY

The method for synthesizing a zirconium complex according to the present invention can suitably be used for medical imaging.

The invention claimed is:

1. A method for synthesizing a zirconium complex, the method comprising setting a temperature of a mixed solution at a certain temperature or more to synthesize a zirconium complex, the mixed solution being obtained by mixing:

an organic solvent containing methanol having a concentration of 20% by volume or more and 95% by volume or less to the mixed solution or ethanol having a concentration of 40% by volume or more and 95% by volume or less to the mixed solution;

a chelating agent solution in which a chelating agent containing a structure represented by General Formula (1) or General Formula (2) is dissolved; and zirconium dissolved in an acidic solution, (1)

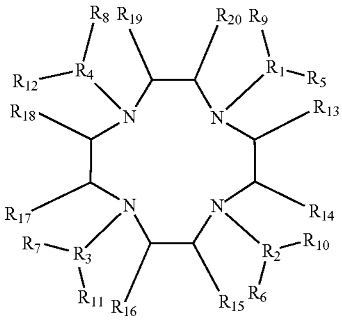

(2)

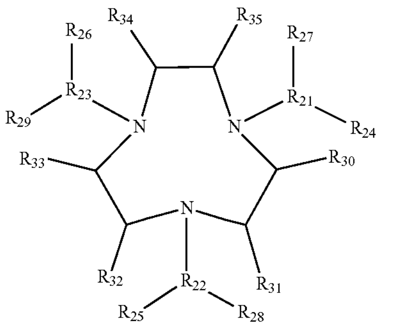

in General Formula (1), $R_1$, $R_2$, $R_3$, and $R_4$ are each hydrogen, a —CH— group, a —$(CH_2)_n$CH— group, a —C(═O)$(CH_2)_n$CH— group, or a —$(CH_2)_n$C(═O)N— group; n is an integer of 0 or more; $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, and $R_{20}$ are each selected from the structures represented by General Formulae (4) to (26), at least two of $R_5$ to $R_{12}$ are selected from the structures represented by General Formulae (4) to (21), R in each of General Formulae (16) to (21) and (26) is selected from the structures represented by Chemical Formulae (27) to (47); n of General Formulae (4) to (21), and (23) to (47) is an integer of 0 or more; a PET probe or a functional group facilitating bonding of a PET probe is optionally added to a functional group contained in $R_5$ to $R_{20}$; the functional group facilitating bonding is a carboxylic acid, a succinimide carboxylate, a tetrafluorophenol carboxylate, an alcohol, an amine, a thiol, an isothiocyanate, maleimide, phenol, aniline, benzoic acid, phenyl isothiocyanate, or an alkyne, an azide, dibenzocyclooctyne (DBCO), bicyclononyne (BCN), trans-cyclooctene (TCO), norbornene, tetrazine, or methyltetrazine, which are each a click chemistry reagent; and $R_5$ to $R_{20}$ optionally have a structure of the functional group facilitating bonding or a condensed structure of a PET probe and the functional group facilitating bonding, and in General Formula (2), $R_{21}$, $R_{22}$, and $R_{23}$ are each hydrogen, a —CH— group, a —$(CH_2)_n$CH— group, a —C(═O)$(CH_2)_n$CH— group, or a —$(CH_2)_n$C(═O)N— group; n is an integer of 0 or more; $R_{24}$, $R_{25}$, $R_{26}$, $R_{27}$, $R_{28}$, $R_{29}$, $R_{30}$, $R_{31}$, $R_{32}$, $R_{33}$, $R_{34}$, and $R_{35}$ are each selected from the structures represented by General Formulae (4) to (26), R in each of General Formulae (16) to (21) and (26) being selected from the structures represented by Chemical Formulae (27) to (47); n of General Formulae (4) to (21), and (23) to (47) is an integer of 0 or more; a PET probe or a functional group facilitating bonding of a PET probe is optionally added to a functional group contained in $R_{24}$ to $R_{35}$; the functional group facilitating bonding is the following functional group: a carboxylic acid, a succinimide carboxylate, a tetrafluorophenol carboxylate, an alcohol, an amine, a thiol, an isothiocyanate, maleimide, phenol, aniline, benzoic acid, phenyl isothiocyanate, or an alkyne, an azide, DBCO, BCN, TCO, norbornene, tetrazine, or methyltetrazine, which are each a click chemistry reagent; and $R_{24}$ to $R_{35}$ optionally have a structure of the functional group facilitating bonding or a condensed structure of a PET probe and the functional group facilitating bonding, (4)

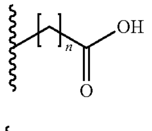

(5)

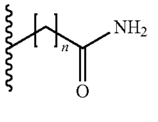

(6)

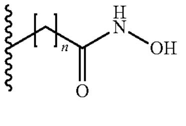

-continued
(7)
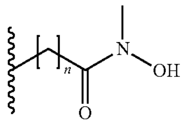
(8)
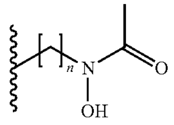
(9)
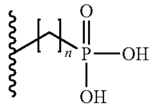
(10)
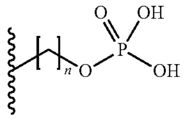
(11)
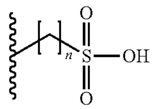
(12)
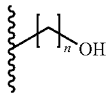
(13)
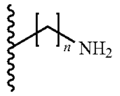
(14)
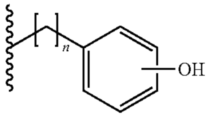
(15)
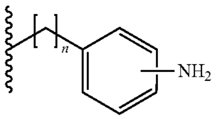
(16)
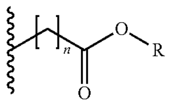
(17)
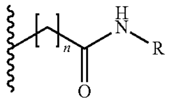
(18)
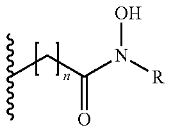
-continued
(19)
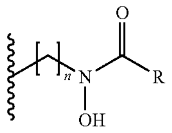
(20)
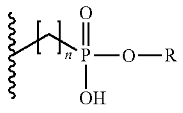
(21)
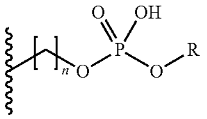
(22)
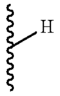
(23)
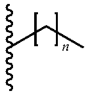
(24)
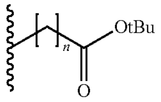
(25)
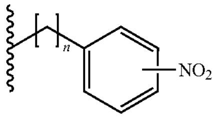
(26)
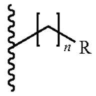
(27)
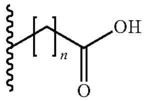
(28)
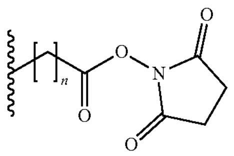
(29)
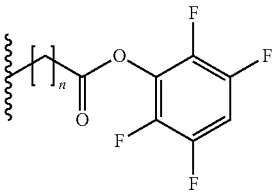
(30)
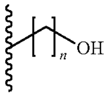

-continued (31)

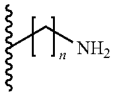

(32)

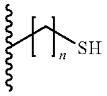

(33)

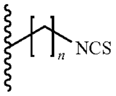

(34)

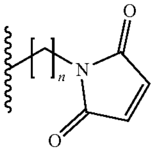

(35)

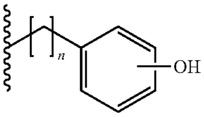

(36)

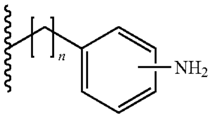

(37)

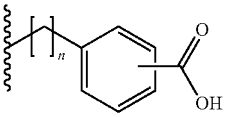

(38)

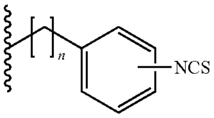

(39)

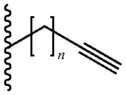

(40)

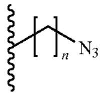

(41)

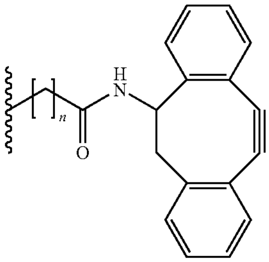

-continued (42)

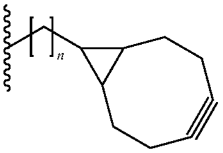

(43)

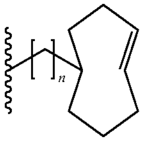

(44)

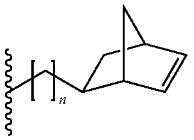

(45)

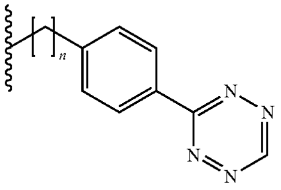

(46)

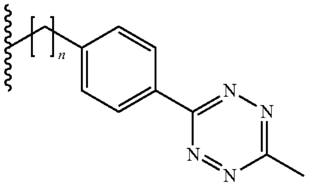

(47)

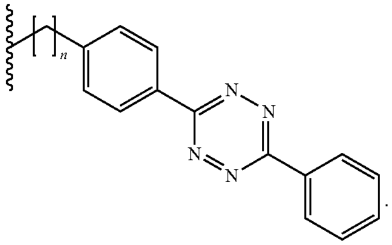

2. The method for synthesizing a zirconium complex according to claim 1, wherein the mixed solution further comprises an oxalic acid concentration of the oxalic acid to the mixed solution is adjusted to be $10^{-6}$ mol/L or more and $10^{-4}$ mol/L or less.

3. The method for synthesizing a zirconium complex according to claim 1, wherein the certain temperature is 35° C. or more.

4. The method for synthesizing a zirconium complex according to claim 1, wherein the organic solvent is a solvent purified with a metal removing agent.

5. The method for synthesizing a zirconium complex according to claim 1, wherein the acidic solution is hydrochloric acid.

6. The method for synthesizing a zirconium complex according to claim 1, wherein zirconium dissolved in the acidic solution is mixed into a solution in which the organic solvent and the chelating agent solution are mixed together immediately before heating at the certain temperature or more or after the heating.

7. The method for synthesizing a zirconium complex according to claim 1, wherein in at least one of $R_5$ to $R_{20}$ in General Formula (1) or at least one of $R_{24}$ to $R_{35}$ in General Formula (2), a molecular probe is bonded via at least one structure selected from the group consisting of Chemical Formulae (16) to (21) and (26) or a linker is bonded to a molecular probe via at least one structure selected from the group consisting of Chemical Formulae (16) to (21) and (26).

8. The method for synthesizing a zirconium complex according to claim 7, wherein the molecular probe is a protein, a peptide, or a low-molecular weight organic compound.

9. The method for synthesizing a zirconium complex according to claim 8, wherein the protein or the peptide is a natural amino acid, a non-natural amino acid, or both the natural amino acid and the non-natural amino acid and has a linear-chain structure or a cyclic structure.

10. The method for synthesizing a zirconium complex according to claim 7, wherein the linker is polyethylene glycol, an alkyl chain, piperazine, or a complex thereof.

11. The method for synthesizing a zirconium complex according to claim 1, wherein the chelating agent is 1,4,7,10-tetraazacyclododecane-1,4,7,10-tetraacetic acid (DOTA).

* * * * *